US011316182B2

(12) United States Patent
Kaneko et al.

(10) Patent No.: US 11,316,182 B2
(45) Date of Patent: Apr. 26, 2022

(54) FUEL CELL MODULE

(71) Applicant: TOYOTA JIDOSHA KABUSHIKI KAISHA, Toyota (JP)

(72) Inventors: Tomohiko Kaneko, Ashigarakami-gun (JP); Masayuki Itou, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 106 days.

(21) Appl. No.: 16/922,203

(22) Filed: Jul. 7, 2020

(65) Prior Publication Data

US 2021/0036344 A1 Feb. 4, 2021

(30) Foreign Application Priority Data

Jul. 29, 2019 (JP) .............................. JP2019-139017

(51) Int. Cl.
| | |
|---|---|
| *H01M 8/04* | (2016.01) |
| *H01M 8/04858* | (2016.01) |
| *H01M 8/04007* | (2016.01) |
| *H01M 8/04701* | (2016.01) |
| *H02M 3/158* | (2006.01) |
| *H02P 27/08* | (2006.01) |

(52) U.S. Cl.
CPC ..... *H01M 8/0488* (2013.01); *H01M 8/04074* (2013.01); *H01M 8/04701* (2013.01); *H02M 3/158* (2013.01); *H01M 2250/20* (2013.01); *H02P 27/08* (2013.01); *H02P 2201/09* (2013.01)

(58) Field of Classification Search
CPC ......... H01M 8/04074; H01M 8/04701; H01M 8/0488

USPC .......................................................... 429/434
See application file for complete search history.

(56) References Cited

U.S. PATENT DOCUMENTS

| | | | |
|---|---|---|---|
| 2007/0178345 A1 | 8/2007 | Takeda et al. | |
| 2010/0060404 A1* | 3/2010 | Raiser | H01F 27/245 336/212 |
| 2018/0272889 A1 | 9/2018 | Nakamura et al. | |
| 2019/0173108 A1* | 6/2019 | Kitamoto | H02M 3/158 |

FOREIGN PATENT DOCUMENTS

| | | |
|---|---|---|
| JP | 2000-232772 | 8/2000 |
| JP | 2007-207582 | 8/2007 |
| JP | 2018-163846 | 10/2018 |

* cited by examiner

*Primary Examiner* — James M Erwin
(74) *Attorney, Agent, or Firm* — Finnegan, Henderson, Farabow, Garrett & Dunner, LLP

(57) ABSTRACT

A fuel cell module has: a first stacked body including a plurality of unit cells stacked on each other; and a second stacked body including a plurality of magnetic body sheets stacked on each other. The magnetic body sheets includes a coil. The first stacked body is superposed on the second stacked body so as to be electrically connected to the coil. A conductor serving as a part of the coil is embedded in each magnetic body sheet. The conductor has a first end portion and a second end portion exposed from surfaces of each magnetic body sheet on opposite sides from each other. The first end portion of the conductor of one of a set of magnetic body sheets adjacent to each other, among the magnetic body sheets, contacts the second end portion of the conductor of the other of the set of magnetic body sheets.

9 Claims, 15 Drawing Sheets

FUEL CELL MODULE

INCORPORATION BY REFERENCE

The disclosure of Japanese Patent Application No. 2019-139017 filed on Jul. 29, 2019 including the specification, drawings and abstract is incorporated herein by reference in its entirety.

BACKGROUND

1. Technical Field

The present disclosure relates to a fuel cell module.

2. Description of Related Art

In a fuel cell system, a converter that steps up the output voltage of a fuel cell stack to be supplied to a motor, for example, is connected to the fuel cell stack (see Japanese Unexamined Patent Application Publication No. 2018-163846 (JP 2018-163846 A), for example). Examples of main electric parts of the converter include a reactor, a diode, a capacitor, and a power switch.

SUMMARY

The reactor requires a coil with a number of turns and a diameter that match the maximum supply power required for the motor, for example, and therefore the fuel cell system requires a converter that matches the specifications of the motor. Therefore, the fuel cell system requires a design change each time the specifications of the motor is changed.

Thus, the present disclosure provides a fuel cell module that can reduce the trouble in making a design change to a fuel cell system.

The present disclosure provides a fuel cell module including: a first stacked body including a plurality of unit cells stacked on each other; and a second stacked body including a plurality of magnetic body sheets stacked on each other, in which: the plurality of magnetic body sheets includes a coil; the first stacked body is superposed on the second stacked body so as to be electrically connected to the coil; a conductor serving as a part of the coil is embedded in each of the plurality of magnetic body sheets; the conductor has a first end portion and a second end portion exposed from surfaces of each of the plurality of magnetic body sheets on opposite sides from each other; and the first end portion of the conductor of one magnetic body sheet of a set of magnetic body sheets that are adjacent to each other, among the plurality of magnetic body sheets, contacts the second end portion of the conductor of the other magnetic body sheet of the set of magnetic body sheets.

In the configuration described above, the first stacked body may have a supply manifold hole configured such that a cooling medium for cooling the plurality of unit cells is supplied through the supply manifold hole, and a discharge manifold hole configured such that the cooling medium is discharged through the discharge manifold hole; and the second stacked body may have an inlet manifold hole communicating with the supply manifold hole, and an outlet manifold hole communicating with the discharge manifold hole.

In the configuration described above, at least one of the plurality of magnetic body sheets may have a first flow path groove configured to connect between the inlet manifold hole and the outlet manifold hole.

In the configuration described above, the conductor may have a first cut piece portion and a second cut piece portion connected to each other at one end; the first cut piece portion and the second cut piece portion may be embedded in each of the plurality of magnetic body sheets at different depths from each other; each of the plurality of magnetic body sheets may have a second flow path groove and a third flow path groove in surfaces of each of the plurality of magnetic body sheets on opposite sides from each other; the second flow path groove may overlap the first cut piece portion, without overlapping the second cut piece portion, in a stacking direction of the second stacked body; the third flow path groove may overlap the second cut piece portion, without overlapping the first cut piece portion, in the stacking direction of the second stacked body; and the second flow path groove and the third flow path groove that are provided in respective surfaces of the set of magnetic body sheets that face each other are connected to each other to allow the inlet manifold hole and the outlet manifold hole to communicate with each other.

In the configuration described above, the one magnetic body sheet of the set of magnetic body sheets may have a fourth flow path groove and the other magnetic body sheet of the set of magnetic body sheets may have a fifth flow path groove, the fourth flow path groove and the fifth flow path groove may be provided in respective surfaces of the set of magnetic body sheets that face each other; the fourth flow path groove may overlap the conductor of the other magnetic body sheet, without overlapping the conductor of the one magnetic body sheet, in a stacking direction of the second stacked body; the fifth flow path groove may overlap the conductor of the one magnetic body sheet, without overlapping the conductor of the other magnetic body sheet, in the stacking direction of the second stacked body; and the fourth flow path groove and the fifth flow path groove may be connected to each other to allow the inlet manifold hole and the outlet manifold hole to communicate with each other.

In the configuration described above, the conductor may have a ring shape; and the first end portion and the second end portion may overlap each other in a stacking direction of the second stacked body.

In the configuration described above, the second stacked body may further include a first current collector plate that is adjacent to a magnetic body sheet that is the farthest from the first stacked body, among the plurality of magnetic body sheets; and the first current collector plate may have a first conductive member configured to electrically connect the conductor to an electric circuit that is external to the fuel cell module, and a sixth flow path groove configured to connect between the inlet manifold hole and the outlet manifold hole.

In the configuration described above, the second stacked body may further include a second current collector plate that is adjacent to a magnetic body sheet that is the closest to the first stacked body, among the plurality of magnetic body sheets; the second current collector plate may have a second conductive member including a first terminal contacting the first stacked body, and a second terminal contacting the magnetic body sheet that is the closest to the first stacked body; and the first terminal may have the same contact area as a size of a power generation region of each of the plurality of unit cells.

In the configuration described above, the second terminal may have the same contact area as a size of the first end portion or the second end portion of the conductor, whichever disposed on a side of the second current collector plate.

According to the present disclosure, it is possible to reduce the trouble of making a design change to the fuel cell system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS (Configuration of Fuel Cell Module)

Figure 1:
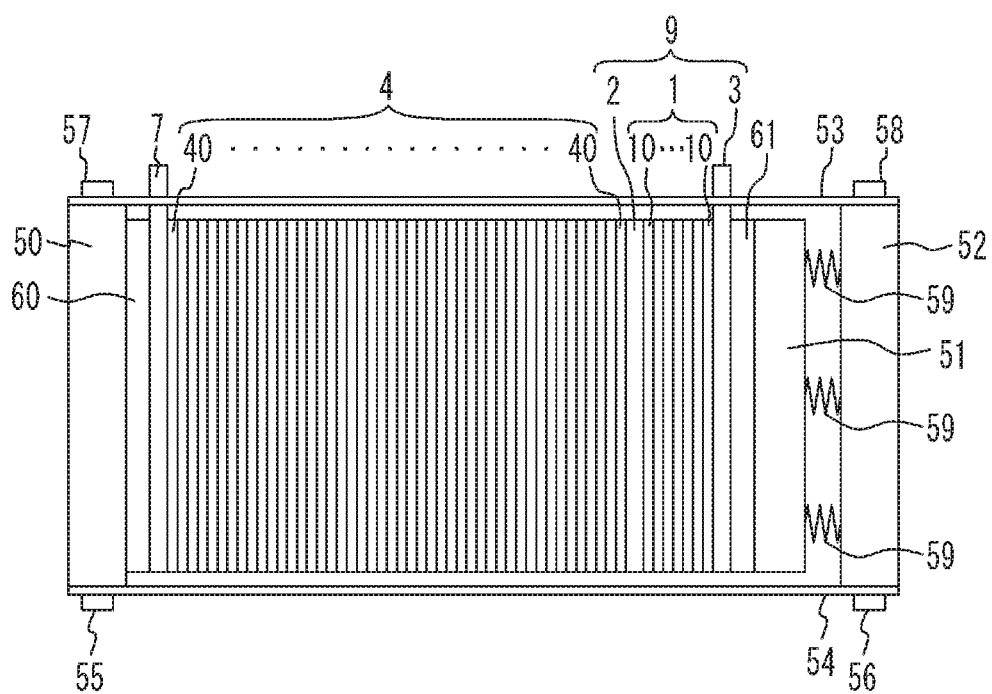
FIG. 1 is a side view illustrating an example of a fuel cell module.

FIG. 1 is a side view illustrating an example of a fuel cell module. The fuel cell module is mounted on a fuel cell vehicle, for example, and supplies power for driving a motor thereof. The usage of the fuel cell module is not limited to automobiles such as fuel cell vehicles, and the fuel cell module may be used for other devices that require power.

The fuel cell module has a reactor stacked body 9, a cell stacked body 4, a pair of end plates 50 and 52, a pressure plate 51, insulating plates 60 and 61, and a terminal plate 7. The fuel cell module also has tension plates 53 and 54, springs 59, and a plurality of bolts 55 to 58.

The cell stacked body 4 is a fuel cell stack that generates power. The reactor stacked body 9 functions as a reactor of a step-up converter that steps up the output voltage of the cell stacked body 4, by way of example.

The end plates 50 and 52 are disposed at respective end portions of the fuel cell module. The pressure plate 51, the reactor stacked body 9, the cell stacked body 4, the insulating plates 60 and 61, and the terminal plate 7 are stacked between the pair of end plates 50 and 52.

The end plates 50 and 52 each have a generally rectangular shape, for example, and are formed from rigid metal such as stainless steel. The tension plates 53 and 54 are fixed to outer peripheral surfaces of the end plates 50 and 52 by the bolts 55 to 58 so as to face each other. The tension plates 53 and 54 maintain the fuel cell module in a stacked state by tension.

Insulation is kept between the end plate 50 on one side and the terminal plate 7 by the insulating plate 60. The insulating plate 60 has a generally rectangular shape, and is formed from an insulator such as a resin, for example. Therefore, electrical leakage from the cell stacked body 4 to the end plate 50 is suppressed.

The terminal plate 7 is adjacent to the cell stacked body 4, and electrically connects the cell stacked body 4 to an external circuit (not illustrated). The terminal plate 7 has a generally rectangular shape, for example, and is formed from conductive metal such as aluminum.

The cell stacked body 4 includes a plurality of unit cells 40 stacked on each other. The unit cells 40 are each a solid polymer fuel cell, for example, and generate power through a chemical reaction between a fuel gas such as a hydrogen gas and an oxidant gas such as oxygen. The unit cells 40 are cooled by a cooling medium such as coolant. The cell stacked body 4 is an example of a first stacked body.

The unit cells 40 each have a generally rectangular shape, for example, and each include a pair of separator plates and a membrane electrode assembly (not illustrated) interposed therebetween. The unit cell 40 on one end side in the stacking direction of the cell stacked body 4 is adjacent to the terminal plate 7, and the unit cell 40 on the other end side is adjacent to the reactor stacked body 9.

The reactor stacked body 9 includes a sheet stacked body 1 and an intermediate current collector plate 2 and an end portion current collector plate 3 that are adjacent to respective sides of the sheet stacked body 1. The reactor stacked body 9 is an example of a second stacked body.

The intermediate current collector plate 2 is adjacent to the cell stacked body 4 and the sheet stacked body 1, and electrically connects between the cell stacked body 4 and the sheet stacked body 1. The intermediate current collector plate 2 collects a current from the cell stacked body 4, and causes the current to flow through the sheet stacked body 1. The intermediate current collector plate 2 is an example of a second current collector plate.

The sheet stacked body 1 includes a plurality of reactor sheets 10 stacked on each other. The reactor sheet 10 has a rectangular shape, for example, and is formed from a magnetic body such as a powder magnetic core. The reactor sheets 10 are an example of magnetic body sheets.

The reactor sheets 10 each include, embedded therein, a conductor that serves as a part of a coil that constitutes a reactor. The conductors of the reactor sheets 10 are electrically connected to each other in the sheet stacked body 1 to constitute a coil.

The sheet stacked body 1 is adjacent to the end portion current collector plate 3 on the opposite side from the intermediate current collector plate 2. The end portion current collector plate 3 electrically connects the sheet stacked body 1 to an external circuit (not illustrated). The end portion current collector plate 3 collects a current from the sheet stacked body 1, and outputs the current to the external circuit. In this manner, the fuel cell module is electrically connected to an external circuit via the terminal plate 7 and the end portion current collector plate 3. The end portion current collector plate 3 is an example of a first current collector plate.

The end portion current collector plate 3 is adjacent to the insulating plate 61. The insulating plate 61 is adjacent to the pressure plate 51.

Insulation is kept between the pressure plate 51 and the end portion current collector plate 3 by the insulating plate 61. The insulating plate 61 has a generally rectangular shape, and is formed from an insulator such as a resin. Therefore, electrical leakage from the cell stacked body 4 to the pressure plate 51 is suppressed.

The pressure plate 51 is formed from rigid metal such as stainless steel, and has a rectangular shape. The pressure plate 51 is connected to the other end plate 52 via the plurality of springs 59. The pressure plate 51 presses the insulating plate 61 toward the end plate 50 on the opposite side using the elastic force of the springs 59. Consequently, the reactor stacked body 9, the cell stacked body 4, the end plate 50, the insulating plates 60 and 61, and the terminal plate 7 closely contact each other.

Figure 2:
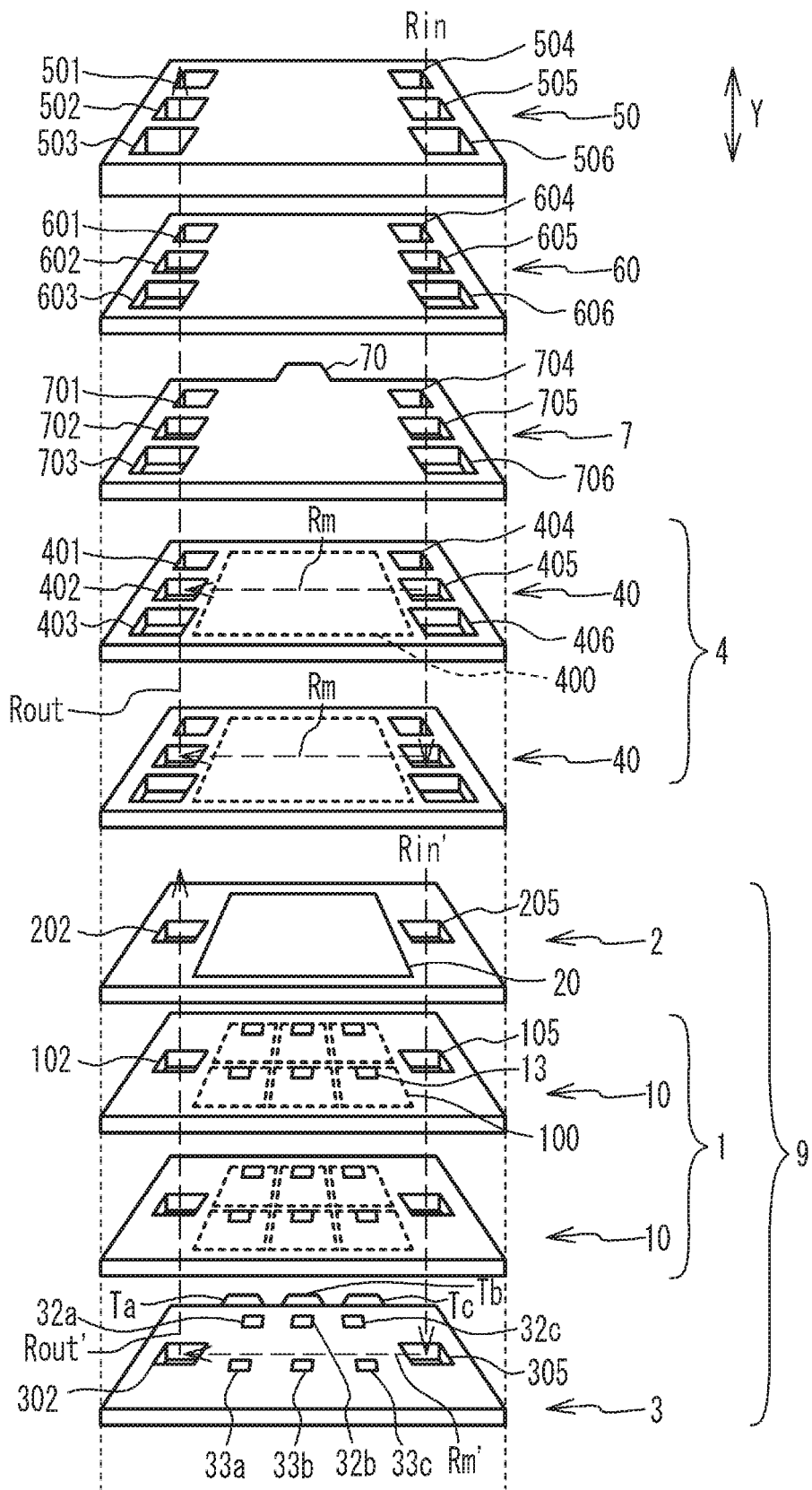
FIG. 2 is an exploded perspective view of the fuel cell module.

FIG. 2 is an exploded perspective view of the fuel cell module. FIG. 2 illustrates a state in which a stacked body from the end plate 50 on the one side to the end portion current collector plate 3 is exploded.

A fuel gas, an oxidant gas, and a cooling medium are supplied to the cell stacked body 4. The unit cells 40 each have a flow path for the fuel gas, a flow path for the oxidant gas, and a flow path for the cooling medium (not illustrated). Therefore, the end plate 50 on the one side, the insulating plate 60, the terminal plate 7, and the cell stacked body 4 are provided with individual manifold holes through which the fuel gas, the oxidant gas, and the cooling medium flow.

For example, each of the unit cells 40 in the cell stacked body 4, the end plate 50, the insulating plate 60, and the terminal plate 7 are provided with through holes 401 to 406, 501 to 506, 601 to 606, and 701 to 706, respectively, that constitute the manifold holes for the fuel gas, the oxidant gas, and the cooling medium.

The through holes 501 to 503 are arranged on one end side of the plate surface of the end plate 50, and the through holes 504 to 506 are arranged on the other end side thereof. The through holes 601 to 603 are arranged on one end side of the plate surface of the insulating plate 60, and the through holes 604 to 606 are arranged on the other end side thereof.

The through holes 701 to 703 are arranged on one end side of the plate surface of the terminal plate 7, and the through holes 704 to 706 are arranged on the other end side thereof. The terminal plate 7 has a projecting portion 70 to be connected to an external circuit. The projecting portion 70 projects outward from an end around the middle between a row of the through holes 701 to 703 and a row of the through holes 704 to 706.

The through holes 401 to 403 are arranged on one end side of the plate surface of the unit cell 40, and the through holes 404 to 406 are arranged on the other end side thereof. A power generation region 400 in which power generation is performed is present at the middle of the plate surface of the unit cell 40. The power generation region 400 is a portion of a region of the membrane electrode assembly in which a chemical reaction between the fuel gas and the oxidant gas occurs.

The through holes 501, 601, 701, and 401 overlap each other in a stacking direction Y of the fuel cell module to constitute a fuel gas-supply manifold hole. The fuel gas flows into the fuel gas-supply manifold hole from an external supply device. The fuel gas is supplied from the fuel gas-supply manifold hole to each of the unit cells 40.

The through holes 506, 606, 706, and 406 overlap each other in the stacking direction Y of the fuel cell module to constitute a fuel gas-discharge manifold hole. The fuel gas flows into the fuel gas-discharge manifold hole from each of the unit cells 40. The fuel gas is discharged from the fuel gas-discharge manifold hole to an external discharge system. The unit cell 40 is provided with a flow path for the fuel gas that connects between the through hole 401 on the inlet side and the through hole 406 on the outlet side.

The through holes 504, 604, 704, and 404 overlap each other in the stacking direction Y of the fuel cell module to constitute an oxidant gas-supply manifold hole. The oxidant gas flows into the oxidant gas-supply manifold hole from an external supply device. The oxidant gas is supplied from the oxidant gas-supply manifold hole to each of the unit cells 40.

The through holes 503, 603, 703, and 403 overlap each other in the stacking direction Y of the fuel cell module to constitute an oxidant gas-discharge manifold hole. The oxidant gas flows into the oxidant gas-discharge manifold hole from each of the unit cells 40. The oxidant gas is discharged from each of the unit cells 40 to an external discharge system. The unit cell 40 is provided with a flow path for the oxidant gas that connects between the through hole 404 on the inlet side and the through hole 403 on the outlet side.

The through holes 505, 605, 705, and 405 overlap each other in the stacking direction Y of the fuel cell module to constitute a cooling medium-supply manifold hole. The cooling medium flows through the cooling medium-supply manifold hole from an external supply device toward each of the unit cells 40 as indicated by the arrow Rin. A gasket for sealing the cooling medium-supply manifold hole is provided around the through holes 605 and 705. The cooling medium-supply manifold hole is an example of a supply manifold hole through which a cooling medium is supplied.

The through holes 502, 602, 702, and 402 overlap each other in the stacking direction Y of the fuel cell module to constitute a cooling medium-discharge manifold hole. The cooling medium flows through the cooling medium-discharge manifold hole from each of the unit cells 40 toward an external discharge system as indicated by the arrow Rout. A gasket for sealing the cooling medium-discharge manifold hole is provided around the through holes 602 and 702. The cooling medium-discharge manifold hole is an example of a discharge manifold hole through which a cooling medium is discharged.

The unit cells 40 are each provided with a flow path for the cooling medium that connects between the through hole 405 on the inlet side and the through hole 402 on the outlet side. The cooling medium flows from the through hole 405 on the inlet side into the through hole 402 on the outlet side through the flow path as indicated by the arrow Rm.

Figure 3:
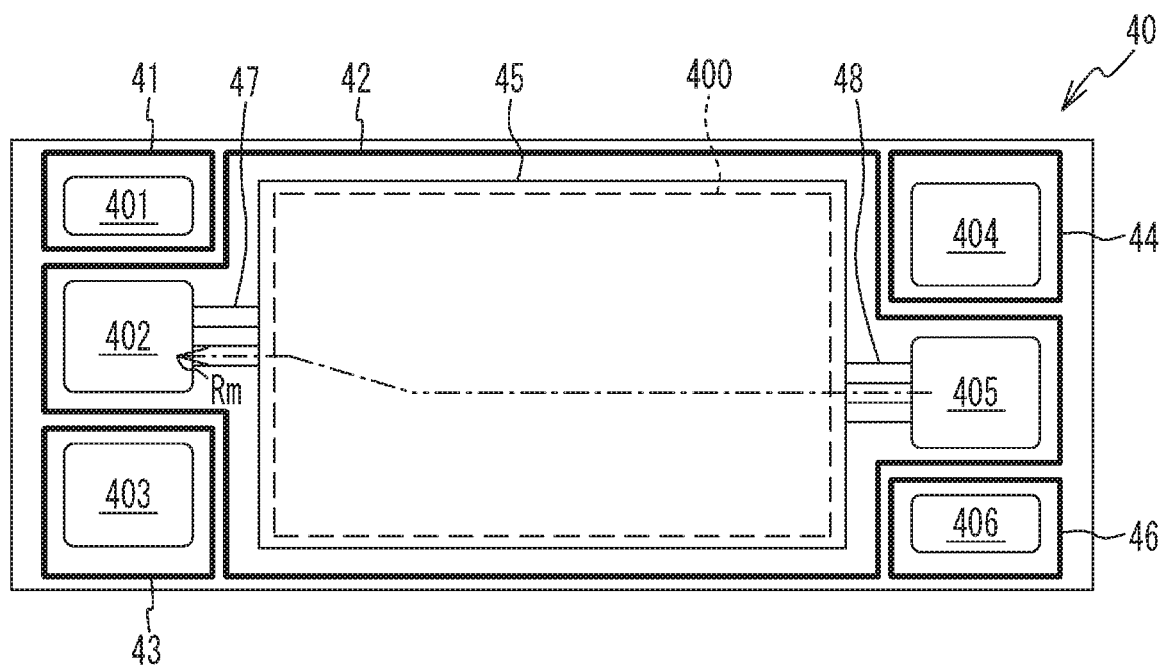
FIG. 3 is a plan view illustrating an example of a unit cell.

FIG. 3 is a plan view illustrating an example of the unit cell 40. FIG. 3 is a plan view of the unit cell 40 as seen from the terminal plate 7 side.

Gaskets 41, 43, 44, and 46 that surround the through holes 401, 403, 404, and 406, respectively, are provided on the plate surface of the unit cell 40 on one side. The gaskets 41, 43, 44, and 46 are formed from rubber or as a metal rib, for example, and seal a region around the through holes 401, 403, 404, and 406, respectively, between adjacent unit cells 40 that are stacked on each other. Consequently, leakage of the fuel gas from the fuel gas-supply manifold hole and the fuel gas-discharge manifold hole is suppressed, and leakage of the oxidant gas from the oxidant gas-supply manifold hole and the oxidant gas-discharge manifold hole is suppressed.

A flow path 45 for the cooling medium that connects between the through hole 405 on the inlet side and the through hole 402 on the outlet side is provided in a plate surface of the unit cell 40 on one side, and a similar flow path (not illustrated) is also provided in the back surface thereof. The flow path 45 is connected to the through hole 405 via a connection flow path 48, and connected to the through hole 402 via a connection flow path 47.

The cooling medium that flows from the through hole 405 on the inlet side flows into the through hole 402 on the outlet side via the connection flow path 48, the flow path 45, and the connection flow path 47 as indicated by the arrow Rm. The flow path 45 is provided so as to overlap the power generation region 400. Therefore, a temperature rise due to power generation by the unit cell 40 is suppressed.

A gasket 42 that surrounds the through holes 402 and 405, the connection flow paths 47 and 48, and the flow path 45 is provided on the plate surface of the unit cell 40 on the one side. The gasket 42 is formed from rubber, for example, and seals a region around the through holes 402 and 405, the connection flow paths 47 and 48, and the flow path 45 between adjacent unit cells 40 that are stacked on each other. Consequently, leakage of the cooling medium from the cooling medium-supply manifold hole and the cooling medium-discharge manifold hole is suppressed.

With reference to FIG. 2 again, six conductors 100 are embedded in each of the reactor sheets 10 in the sheet stacked body 1, by way of example, and the conductors 100 constitute a part of a coil of a reactor.

The intermediate current collector plate 2 has a conductive member 20 that electrically connects between the cell stacked body 4 and the conductors 100 of each of the reactor sheets 10 in the sheet stacked body 1. Terminals of the conductive member 20 contact end portions 13 of the conductors 100 that are exposed from a surface of the reactor sheet 10.

The end portion current collector plate 3 connects the conductors 100 of each of the reactor sheets 10 to an external circuit. The end portion current collector plate 3 has six terminals 32a to 32c and 33a to 33c that contact end portions (not illustrated) of the conductors 100 that are exposed from the back surface of the reactor sheet 10, and terminals Ta to Tc to be connected to an external circuit.

With the configuration described above, a current flows from the cell stacked body 4 to the conductors 100 in the sheet stacked body 1, which causes the conductors 100 to generate heat. Therefore, the cell stacked body 4 can be warmed utilizing heat of the reactor stacked body 9. If the reactor stacked body 9 is heated excessively, however, the performance of the reactor and the power generation performance of the cell stacked body 4 may be lowered.

In the case where a cooling device such as a radiator is provided outside the fuel cell module, for example, the installation space for the cooling device is required, and the cost is increased. Therefore, the conductors 100 are cooled using the cooling medium in the cell stacked body 4 such that a temperature rise of the reactor stacked body 9 is suppressed. The reactor stacked body 9 has an inlet manifold hole and an outlet manifold hole through which the cooling medium flows.

For example, the reactor sheets 10 in the sheet stacked body 1 and the intermediate current collector plate 2 are provided with through holes 105 and 205 that constitute the inlet manifold hole and through holes 102 and 202 that constitute the outlet manifold hole. In addition, the end portion current collector plate 3 is provided with a recessed portion 305 that constitutes the bottom portion of the inlet manifold hole and a recessed portion 302 that constitutes the bottom portion of the outlet manifold hole.

The through hole 202 is provided on one end side of the plate surface of the intermediate current collector plate 2, and the through hole 205 is provided on the other end side thereof. The through hole 102 is provided on one end side of the sheet surface of the reactor sheet 10, and the through hole 105 is provided on the other end side thereof. The recessed portion 302 is provided on one end side of the plate surface of the end portion current collector plate 3, and the recessed portion 305 is provided on the other end side thereof.

The through holes 105 and 205 and the recessed portion 305 overlap each other in the stacking direction Y of the fuel cell module to constitute the inlet manifold hole. The through holes 102 and 202 and the recessed portion 302 overlap each other in the stacking direction Y of the fuel cell module to constitute the outlet manifold hole.

The inlet manifold hole communicates with the cooling medium-supply manifold hole to allow the cooling medium in the cell stacked body 4 to flow thereinto. For example, the through holes 105 and 205 and the recessed portion 305 overlap the through holes 405, 505, 605, and 705 of the cooling medium-supply manifold hole in the stacking direction Y of the fuel cell module.

The outlet manifold hole communicates with the cooling medium-discharge manifold hole to allow the cooling medium to flow out thereof. For example, the through holes 102 and 202 and the recessed portion 302 overlap the through holes 402, 502, 602, and 702 of the cooling medium-supply manifold hole in the stacking direction Y of the fuel cell module.

Consequently, the cooling medium flows through the cooling medium-supply manifold hole, and thereafter flows through the inlet manifold hole as indicated by the arrow Rin'. Further, the cooling medium flows through the outlet manifold hole as indicated by the arrow Rout', and thereafter flows through the cooling medium-discharge manifold hole. Thus, the conductors 100 of each of the reactor sheets 10 are cooled by the cooling medium.

The cooling medium-supply manifold hole overlaps the inlet manifold hole in the stacking direction Y, and the cooling medium-discharge manifold hole overlaps the outlet manifold hole in the stacking direction Y. Therefore, the inlet manifold hole is positioned on the extension of the cooling medium-supply manifold hole, and the outlet manifold hole is positioned on the extension of the cooling medium-discharge manifold hole.

Consequently, the number of parts required to connect between the cooling medium-supply manifold hole and the inlet manifold hole and connect between the cooling medium-discharge manifold hole and the outlet manifold hole is reduced compared to a case where the inlet manifold hole and the outlet manifold hole are not located on the extension.

The cooling medium flows from the inlet manifold hole to the outlet manifold hole as indicated by the arrow Rm', for example, in the end portion current collector plate 3. The end portion current collector plate 3 is provided with a flow path for the cooling medium that connects between the recessed portion 305 on the inlet side and the recessed portion 302 on the outlet side. The configuration of the reactor sheet 10, the intermediate current collector plate 2, and the end portion current collector plate 3 will be described below.

Configuration of Reactor Sheet 10

Figure 4:
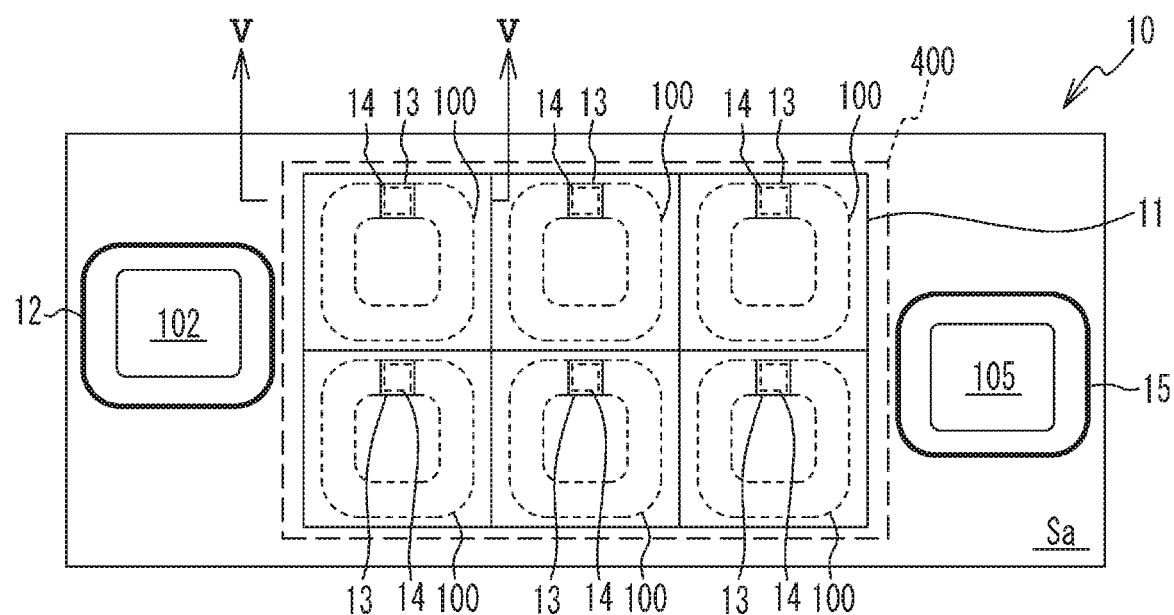
FIG. 4 is a plan view illustrating an example of a reactor sheet.

FIG. 4 is a plan view illustrating an example of the reactor sheet 10. FIG. 4 is a plan view of the reactor sheet 10 as seen from the cell stacked body 4 side.

Figure 5:
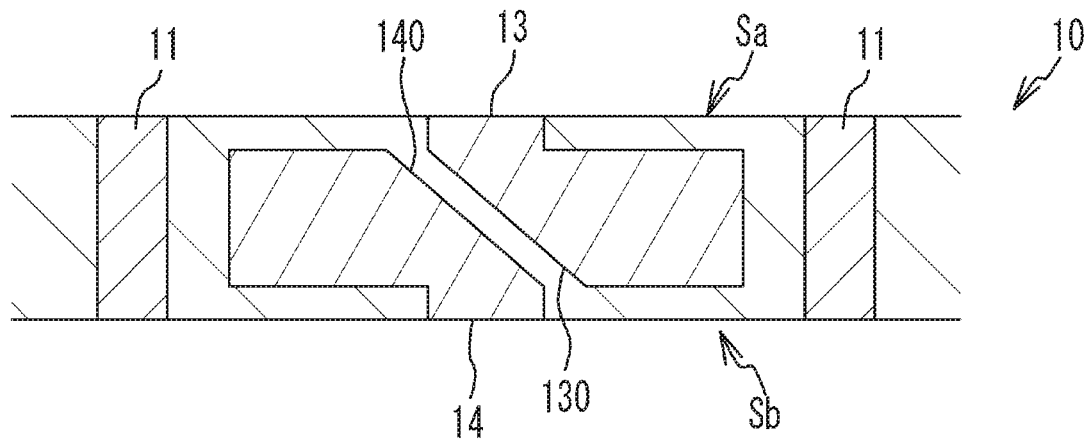
FIG. 5 is a sectional view of the reactor sheet taken along the line V-V in FIG. 4.

FIG. 5 is a sectional view of the reactor sheet 10 taken along the line V-V in FIG. 4. The reactor sheet 10 is formed by pressing a magnetic body with the conductors 100 embedded therein, for example. The reactor sheet 10 has surfaces Sa and Sb in a rectangular shape.

The reactor sheet 10 has gaskets 12 and 15 that surround the through holes 102 and 105, respectively. The gaskets 12 and 15 are each formed as an elastic member such as rubber, for example, and bonded to the surface Sa of the reactor sheet 10 on the cell stacked body 4 side.

The gaskets 12 and 15 seal a region around the through holes 102 and 105, respectively, between the reactor sheet 10 and a different reactor sheet 10 or the intermediate current collector plate 2 that is adjacent thereto when the sheet stacked body 1 is stacked. Consequently, leakage of the cooling medium from the inlet manifold hole and the outlet manifold hole is suppressed.

The conductors 100 each have a flat ring shape as indicated by the dashed lines as the reactor sheet 10 is viewed in plan. The conductors 100 are arranged so as to overlap the power generation regions 400 of the unit cells 40 in the stacking direction Y of the fuel cell module. The conductors 100 are formed from a conductive raw material such as copper, for example. The surfaces of the conductors 100 may be covered with an insulating coating in order to prevent electrical leakage, for example.

The reactor sheet 10 also has a shielding portion 11 that shields the conductors 100 from each other. The shielding portion 11 has the same thickness as that of the reactor sheet 10, for example, and is provided in a grid shape so as to separate the conductors 100 from each other as viewed in plan. The shielding portion 11 suppresses magnetic interference among the conductors 100 by covering the side surfaces of the conductors 100. The shielding portion 11 is formed from a non-magnetic body such as aluminum, for example.

An end portion 13 of the conductor 100 at one end is exposed from the surface Sa on the cell stacked body 4 side, and an end portion 14 of the conductor 100 at the other end is exposed from the surface Sb on the end portion current collector plate 3 side. That is, the end portion 13 at one end and the end portion 14 at the other end are exposed from the surfaces Sa and Sb on the opposite sides from each other. Portions of the conductor 100 other than the end portions 13 and 14 are not exposed from the surfaces Sa and Sb. The surface shape of the exposed portions of the end portions 13 and 14 are a square shape, for example. However, the present disclosure is not limited thereto. The end portions 13 and 14 are an example of a first end portion and a second end portion.

The end portions 13 and 14 overlap each other in the stacking direction Y of the fuel cell module. Therefore, the end portion 13 of the conductor 100 of one reactor sheet 10, of a set of reactor sheets 10 that are adjacent to each other, can directly contact the end portion 14 of the conductor 100 of the other reactor sheet 10. If the end portions 13 and 14 of the reactor sheets 10 are displaced from each other, it is necessary to electrically connect between the end portions 13 and 14 via a conductive member etc., for example.

Thus, with the configuration described above, the conductors 100 of the reactor sheets 10 are electrically connected to each other by stacking only the reactor sheets 10 on each other without using a conductive member, for example. Therefore, the height of the reactor sheets 10 in the reactor stacked body 9 is reduced.

The end portions 13 and 14 are provided at the same positions on the surfaces Sa and Sb of the reactor sheets 10 as viewed in plan. Therefore, for example, back surfaces 130 and 140 of the end portions 13 and 14 respectively have tapered shapes that are symmetric to each other such that the conductor 100 has a flat ring shape along the surfaces Sa and Sb. The back surfaces 130 and 140 are not limited to having a tapered surface, and may have other shapes that are symmetric to each other.

Configuration of Intermediate Current Collector Plate 2

Figure 6:
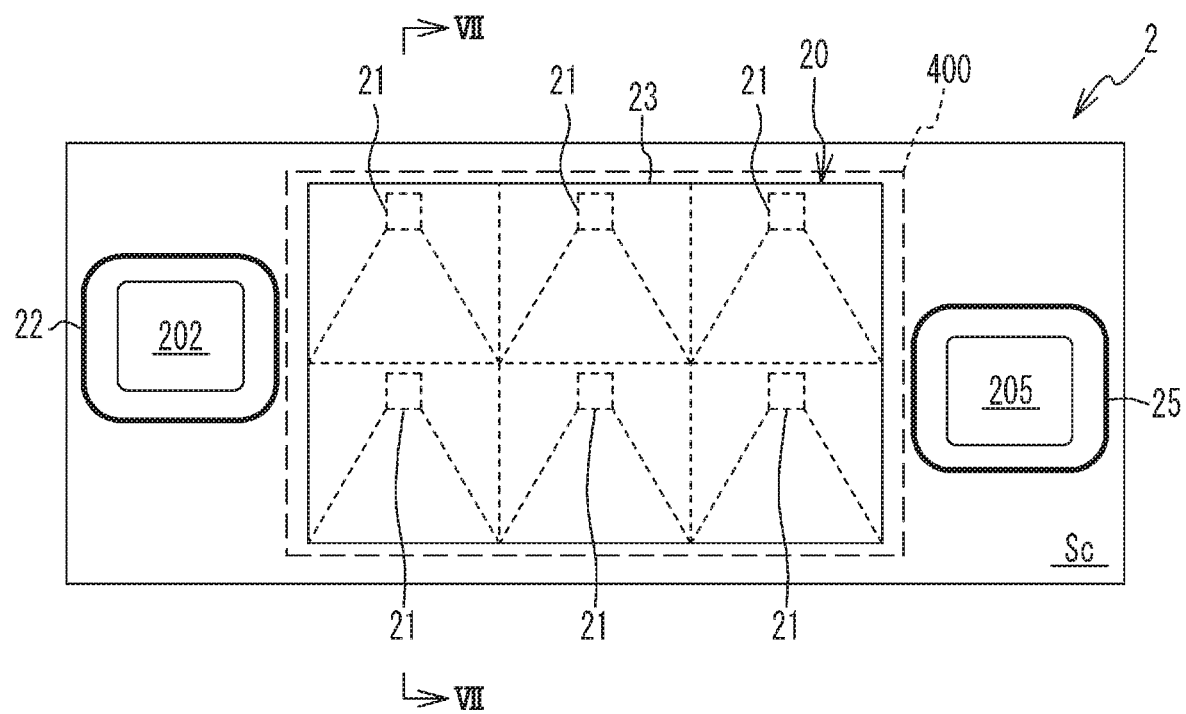
FIG. 6 is a plan view illustrating an example of an intermediate current collector plate.

FIG. 6 is a plan view illustrating an example of the intermediate current collector plate 2. FIG. 6 is a plan view of the intermediate current collector plate 2 as seen from the cell stacked body 4 side.

Figure 7:
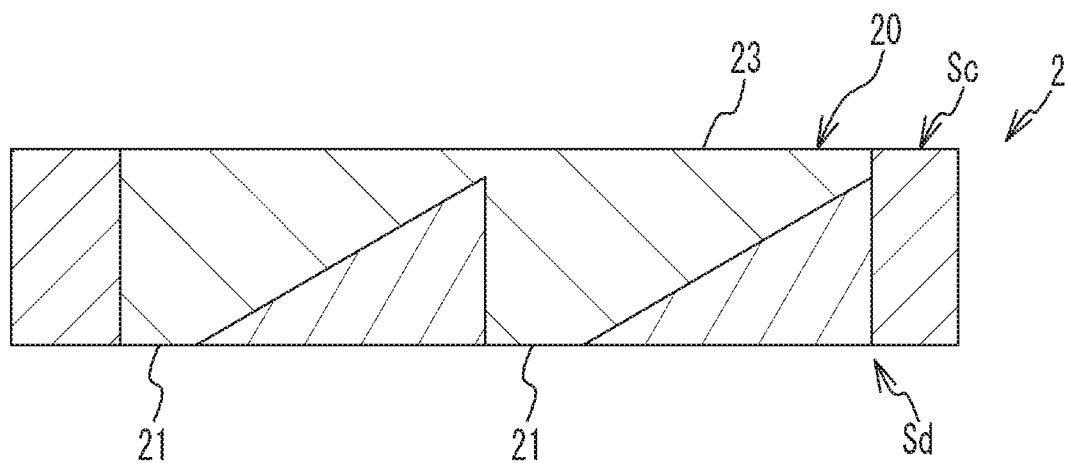
FIG. 7 is a sectional view of the intermediate current collector plate taken along the line VII-VII in FIG. 6.

FIG. 7 is a sectional view of the intermediate current collector plate 2 taken along the line VII-VII in FIG. 6. The intermediate current collector plate 2 is adjacent to the reactor sheet 10 that is the closest to the cell stacked body 4. The intermediate current collector plate 2 is a plate-like member made of a resin, for example, and have surfaces Sc and Sd in a rectangular shape.

The intermediate current collector plate 2 has gaskets 22 and 25 that surround the through holes 202 and 205, respectively. The gaskets 22 and 25 are each formed as an elastic member such as rubber, for example, and bonded to the surface Sc of the reactor sheet 10 on the cell stacked body 4 side.

The gaskets 22 and 25 seal a region around the through holes 202 and 205, respectively, between the intermediate current collector plate 2 and the unit cell 40 that is adjacent thereto. Consequently, leakage of the cooling medium from the inlet manifold hole and the outlet manifold hole is suppressed.

The intermediate current collector plate 2 has a conductive member 20 that electrically connects between the cell stacked body 4 and the conductors 100 of each of the reactor sheets 10 in the sheet stacked body 1. The conductive member 20 is a metal member such as copper that is conductive. The conductive member 20 is an example of a second conductive member.

The conductive member 20 includes a rectangular terminal 23 on the surface Sc on the cell stacked body 4 side, and includes six terminals 21 in a square shape on the surface Sd on the sheet stacked body 1 side as indicated by the dashed lines. The conductive member 20 has a flat plate shape in which a plurality of generally quadrangular pyramids are disposed with the terminals 21 serving as the vertexes and with the terminal 23 serving as the bottom surface, for example.

The terminal 23 contacts the power generation region 400 of the unit cell 40 that is the closest to the reactor stacked body 9, among of the unit cells 40 in the cell stacked body 4. The terminals 21 contact the end portions 13 of the conductors 100 of the reactor sheet 10 that is the closest to the cell stacked body 4, among the reactor sheets 10 in the sheet stacked body 1.

Consequently, the cell stacked body 4 and the reactor stacked body 9 are electrically connected to each other, and therefore a current flows from the cell stacked body 4 to the conductors 100 in the sheet stacked body 1. The terminal 23 is an example of a first terminal, and the terminals 21 are examples of a second terminal.

In the case where the power generation region 400 of each of the unit cells 40 includes a portion (hereinafter referred to as a "contact region") in contact with the terminal 23 and a portion (hereinafter referred to as a "non-contact region") not in contact with the terminal 23, for example, a current tends to flow through the contact region compared to the non-contact region, which causes fluctuations in the power generation state.

Therefore, the terminal 23 has the same contact area as the size of the power generation region 400 of the unit cell 40. Thus, fluctuations in the power generation state in the power generation region 400 are suppressed to suppress a reduction in the power generation performance of the cell stacked body 4. The contact area of the terminal 23 may be substantially the same as the size of the power generation region 400. By way of example, the contact area of the terminal 23 is 80 to 100(%) of the area of the power generation region 400 as viewed in plan.

Meanwhile, the terminals 21 have the same contact area as the size of the end portions 13 of the reactor sheet 10. Therefore, the electrical resistance between the terminals 21 and the end portions 13 is reduced compared to a case where the respective contact areas of the terminals 21 and the end portions 13 are different from each other. The contact area of the terminals 21 may be substantially the same as the size of the end portions 13. By way of example, the contact area of the terminals 21 is 80 to 100(%) of the area of the end portions 13 as viewed in plan.

In this manner, the conductive member 20 directly contacts the power generation region 400 of the unit cell 40 and the end portions 13 of the reactor sheet 10. Thus, the intermediate current collector plate 2 can conduct heat generated by the conductors 100 in the sheet stacked body 1 to the unit cells 40 in the cell stacked body 4 via the conductive member 20. Therefore, occurrence of flooding due to condensation of water generated by the chemical reaction in the unit cells 40 is suppressed.

Configuration of End Portion Current Collector Plate 3

Figure 8:
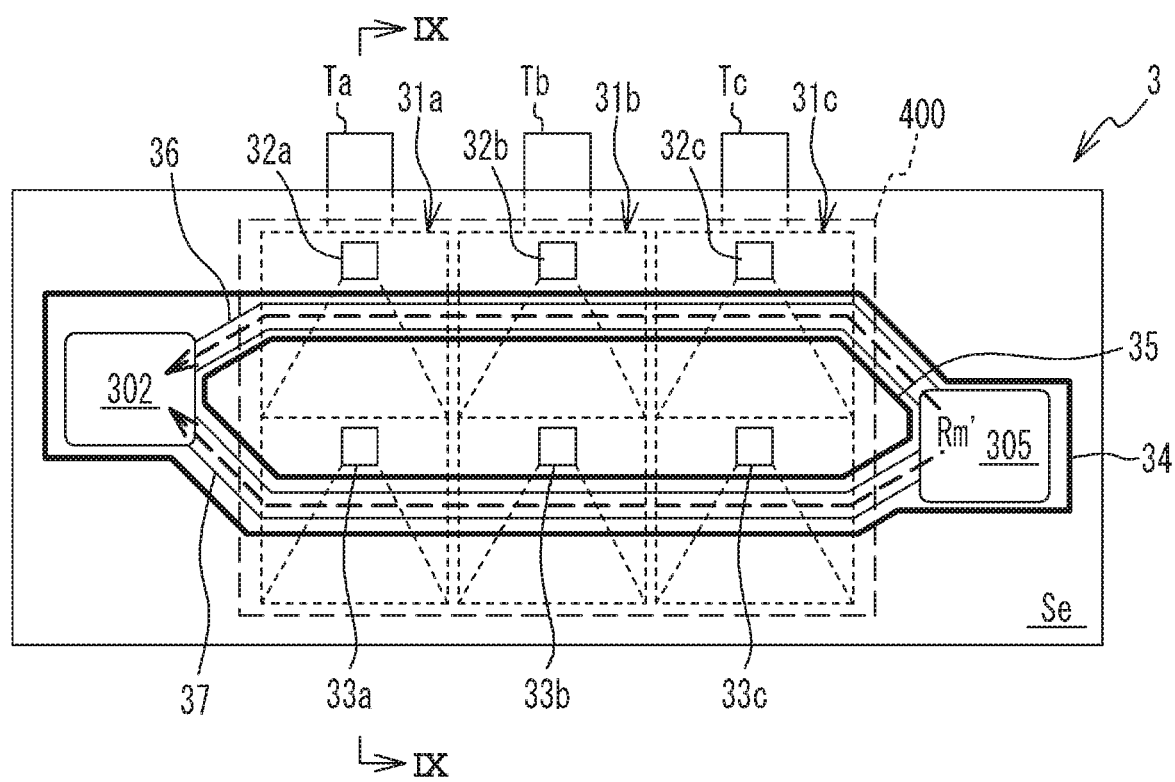
FIG. 8 is a plan view illustrating an example of an end portion current collector plate.

FIG. 8 is a plan view illustrating an example of the end portion current collector plate 3. FIG. 8 is a plan view of the end portion current collector plate 3 as seen from the sheet stacked body 1 side.

Figure 9:
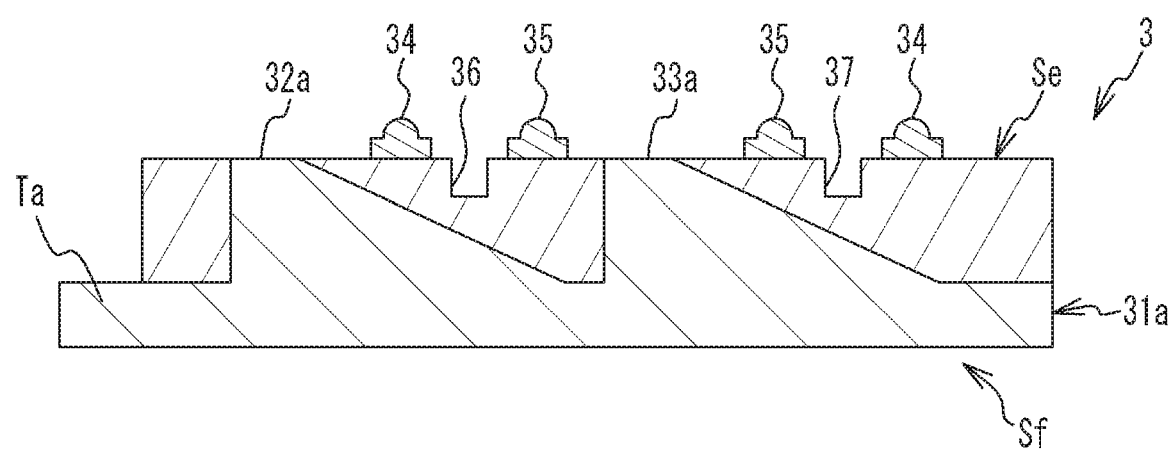
FIG. 9 is a sectional view of the end portion current collector plate taken along the line IX-IX in FIG. 8.

FIG. 9 is a sectional view of the end portion current collector plate 3 taken along the line IX-IX in FIG. 8. The end portion current collector plate 3 is adjacent to the reactor sheet 10 that is the farthest from the cell stacked body 4, among the reactor sheets 10 in the sheet stacked body 1.

The end portion current collector plate 3 has conductive members 31a to 31c that have terminals Ta to Tc, 32a to 32c, and 33a to 33c, respectively, two flow path grooves 36 and 37 that connect between the recessed portions 302 and 305, and gaskets 34 and 35. The flow path grooves 36 and 37 are formed in a surface Se of the end portion current collector plate 3 on the sheet stacked body 1 side.

As described above, the recessed portion 305 constitutes the inlet manifold hole for the cooling medium, and the recessed portion 302 constitutes the outlet manifold hole for the cooling medium. The cooling medium flows through the flow path grooves 36 and 37 from the recessed portion 305 as indicated by the arrow Rm' to reach the recessed portion 302. The flow path grooves 36 and 37 are examples of a sixth flow path groove.

Therefore, the sheet stacked body 1 is cooled by the cooling medium. The surfaces of the flow path grooves 36 and 37 are plated or coated with a resin to prevent corrosion due to the cooling medium, for example. The shape and the number of the flow path grooves 36 and 37 are not limited.

The gaskets 34 and 35 surround the recessed portions 302 and 305 and the flow path grooves 36 and 37. One of the gaskets (the gasket 34) is disposed on the outer side of the recessed portions 302 and 305 and the flow path grooves 36 and 37, and the other of the gaskets (the gasket 35) is disposed on the inner side of the recessed portions 302 and 305 and the flow path grooves 36 and 37. The gaskets 34 and 35 are each formed as an elastic member such as rubber, for example, and bonded to the surface Se of the end portion current collector plate 3 on the sheet stacked body 1 side.

The gaskets 34 and 35 seal a region around the recessed portions 302 and 305 and the flow path grooves 36 and 37 between the end portion current collector plate 3 and the reactor sheet 10 that is adjacent thereto. Consequently, leakage of the cooling medium from the inlet manifold hole, the outlet manifold hole, and the flow path grooves 36 and 37 is suppressed.

The conductive members 31a to 31c electrically connect the conductors 100 in the reactor stacked body 9 to an external electric circuit (not illustrated). The conductive members 31a to 31c are each a metal member such as copper that is conductive. The conductive members 31a to 31c are examples of a first conductive member.

The conductive member 31a has a terminal Ta that projects from a side surface and two terminals 32a and 33a exposed to the surface Se on one side. The conductive member 31b has a terminal Tb that projects from a side surface and two terminals 32b and 33b exposed to the surface Se on the one side. The conductive member 31c has a terminal Tc in a plate shape that projects from a side surface and two terminals 32c and 33c in a square shape exposed to the surface Se on the one side. The terminals 32a to 32c and 33a to 33c are provided at positions not overlapping the flow path grooves 36 and 37 such that appropriate current collection is not hindered.

The conductive members 31a to 31c each have a flat plate shape in which two generally quadrangular pyramids are provided with the terminals 32a to 32c and 33a to 33c serving as the vertexes, for example. The respective bottom surfaces of the conductive members 31a to 31c are exposed to a surface Sf on the opposite side from the surface Se, and the terminals Ta to Tc project from the respective bottom surface sides.

The terminals Ta to Tc are connected to an external electric circuit. The terminals Ta to Tc are connected to an electric circuit for each phase of a three-phase motor via a step-up converter, for example. In addition, the terminals 32a to 32c and 33a to 33c contact six end portions 14 of the reactor sheet 10 that is adjacent to the end portion current collector plate 3. Consequently, the conductive members 31a to 31c electrically connect the conductors 100 in the reactor stacked body 9 to an external electric circuit.

In this manner, the end portion current collector plate 3 is adjacent to the reactor sheet 10 that is the farthest from the cell stacked body 4, and has the conductive members 31a to 31c and the flow path grooves 36 and 37. The conductive members 31a to 31c are connected to an external electric circuit, and therefore generate heat because of a resistive component.

However, a temperature rise of the conductive members 31a to 31c is suppressed by the cooling medium that flows through the flow path grooves 36 and 37. In addition, the end portion current collector plate 3 is adjacent to the reactor sheet 10 that is the farthest from the cell stacked body 4, and therefore the cooling medium is returned from the inlet manifold hole to the outlet manifold hole via the flow path grooves 36 and 37 at the farthest position from the cell stacked body 4. Therefore, overcooling of the cell stacked body 4 by the cooling medium is suppressed.

Configuration of Reactor

Figure 10:
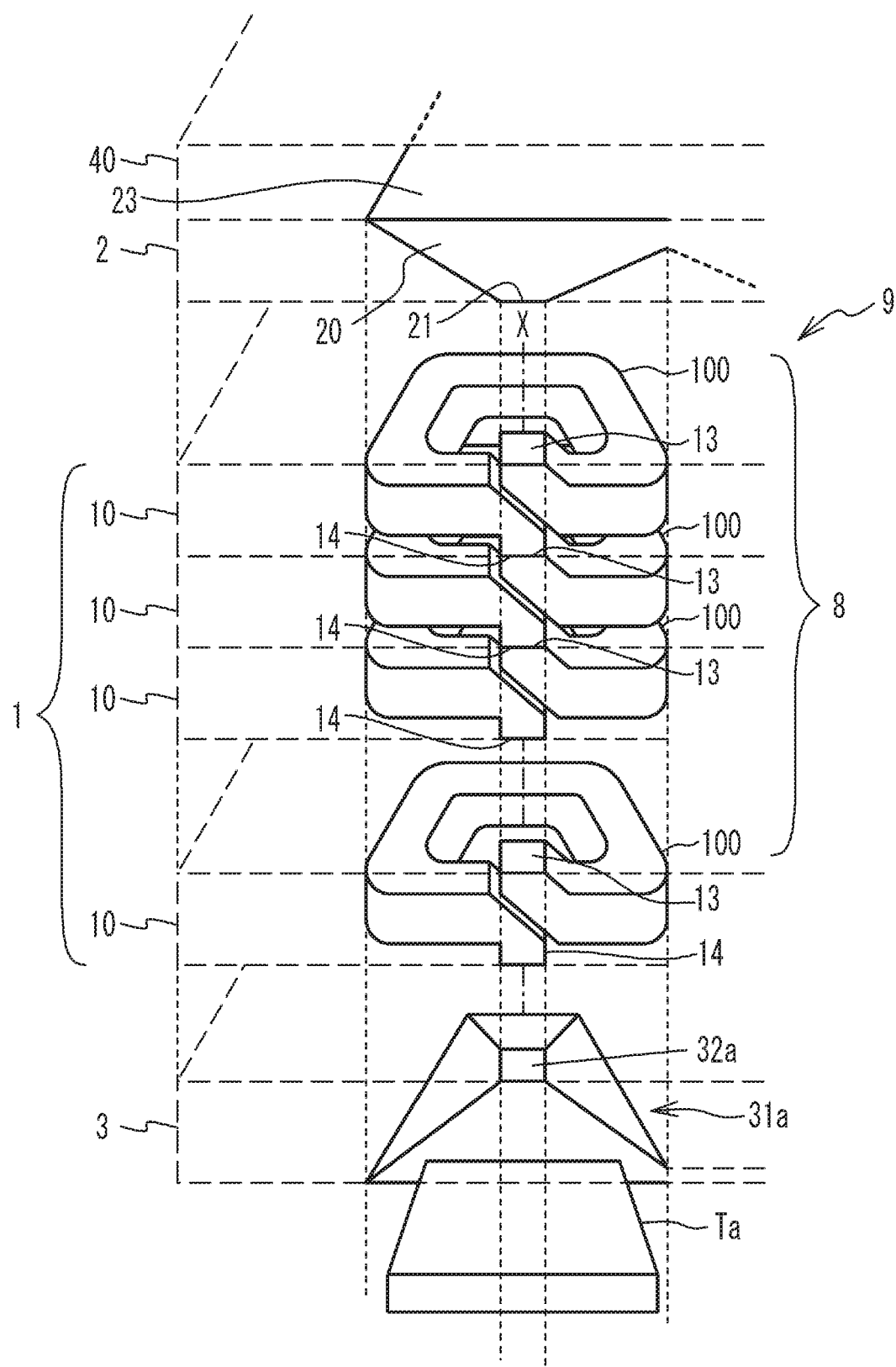
FIG. 10 is a perspective view illustrating an example of a coil in a reactor stacked body.

FIG. 10 is a perspective view illustrating an example of the coil 8 in the reactor stacked body 9. While FIG. 10 illustrates only the coil 8 that is constituted from one of the six conductors 100 of each of the reactor sheets 10, the other conductors 100 also have the same configuration. As described above, the reactor stacked body 9 includes the sheet stacked body 1 that serves as a reactor, and the intermediate current collector plate 2 and the end portion current collector plate 3 that serve as the terminals of the coil 8.

In the sheet stacked body 1, the end portion 13 of the conductor 100 of one reactor sheet 10, of the reactor sheets 10 that are adjacent to each other, contacts the end portion 14 of the conductor 100 of the other reactor sheet 10. Therefore, as described above, the conductors 100 of a set of reactor sheets 10 that are adjacent to each other contact each other to be electrically connected to each other.

Consequently, the conductors 100 of the reactor sheets 10 constitute the coil 8 that is wound about an axis X in the stacking direction. The coil 8 is embedded in the magnetic body of the reactor sheets 10 in the sheet stacked body 1. Therefore, the reactor stacked body 9 functions as a reactor when a current from the cell stacked body 4 flows therethrough.

The conductor 100 for one turn of the coil 8 is embedded in each of the reactor sheets 10. Therefore, the number of turns of the coil can be adjusted by adjusting the number of the reactor sheets 10 in the reactor stacked body 9. For example, the coil 8 with ten turns is obtained in the case where ten reactor sheets 10 are stacked on each other.

In this manner, the number of turns of the coil 8 can be adjusted, and therefore the inductance value of the reactor can be easily set to a desired value.

In the present example, the conductor 100 for one turn of the coil 8 is embedded in each of the reactor sheets 10. However, the present disclosure is not limited thereto. For example, the conductor 100 for half a turn of the coil 8 may be embedded in each of the reactor sheets 10, or the conductor 100 for a quarter of a turn of the coil 8 may be embedded therein, as described later.

In order to obtain a coil 8 with ten turns, for example, 20 reactor sheets 10 are required in the case where the conductor 100 for half a turn of the coil 8 is embedded in each of the reactor sheets 10, and 40 reactor sheets 10 are required in the case where the conductor 100 for a quarter of a turn of the coil 8 is embedded in each of the reactor sheets 10. The shape of the conductors 100 is not limited as long as the coil 8 is constituted by electrically connecting the conductors 100 in the reactor sheets 10.

In addition, the end portion 13 of the conductor 100 of the reactor sheet 10 that is adjacent to the intermediate current collector plate 2 contacts terminal 21 of the conductive member 20 of the intermediate current collector plate 2 on one side. The terminal 23 of the conductive member 20 on the other side contacts the unit cell 40 that is adjacent to the intermediate current collector plate 2. On the other hand, the end portion 14 of the conductor 100 of the reactor sheet 10 that is adjacent to the end portion current collector plate 3 contacts the terminal 32a of the conductive member 31a of the end portion current collector plate 3.

Therefore, the reactor can be electrically connected to a circuit as a part of a step-up converter that steps up the output voltage of the cell stacked body 4, for example, as described below.

Circuit Configuration of Fuel Cell System

Figure 11:
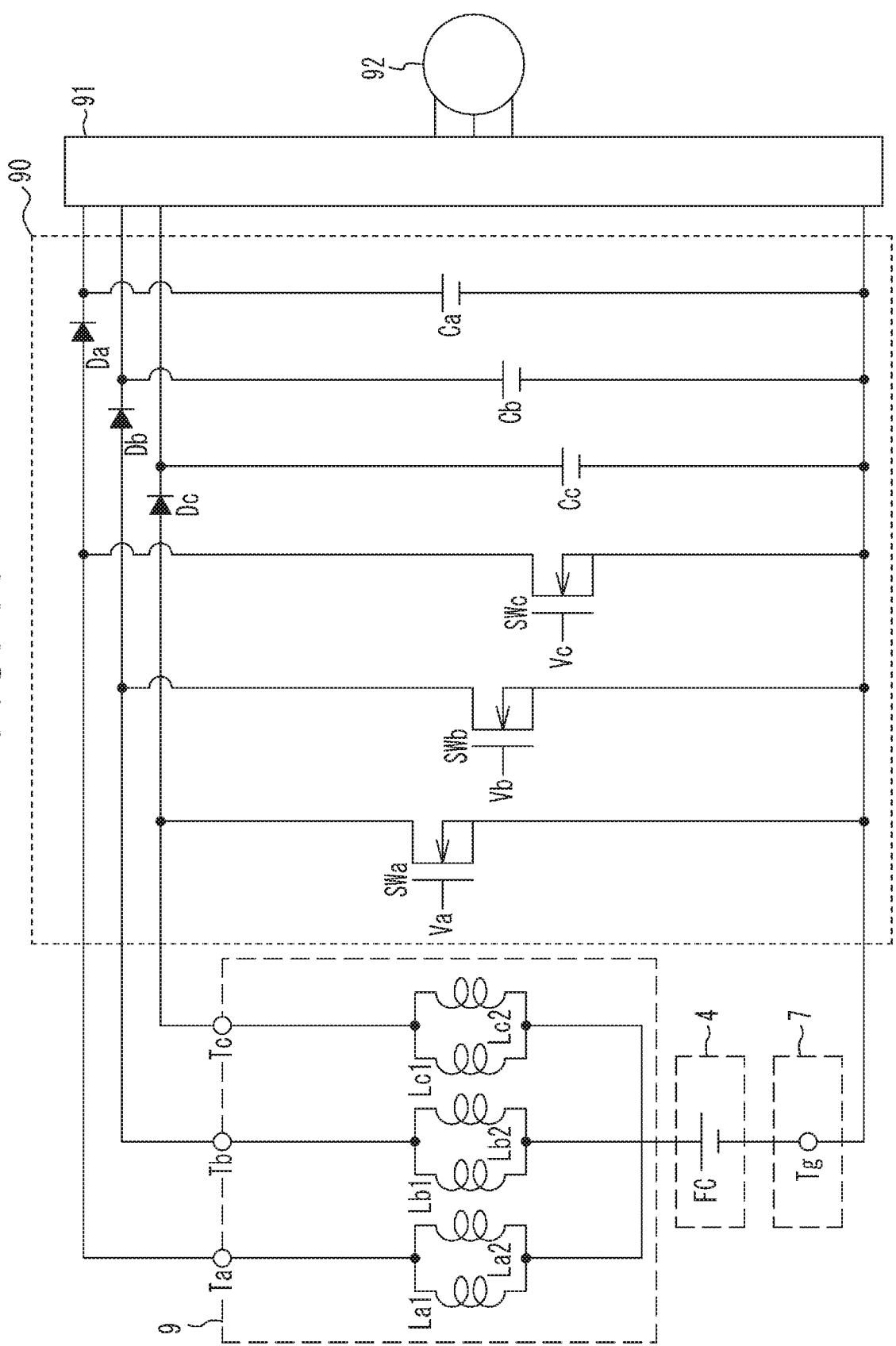
FIG. 11 is a circuit diagram illustrating an example of the circuit configuration of a fuel cell system.

FIG. 11 is a circuit diagram illustrating an example of the circuit configuration of a fuel cell system. The fuel cell system is mounted on a fuel cell vehicle, for example, and includes a fuel cell FC, reactors La1, La2, Lb1, Lb2, Lc1, and Lc2, a step-up circuit 90, an inverter 91, and a motor 92. The step-up circuit includes switching elements SWa to SWc, diodes Da to Dc, and capacitors Ca to Cc.

The fuel cell FC is the cell stacked body 4, and supplies power. The fuel cell FC is connected to the reactors La1, La2, Lb1, Lb2, Lc1, and Lc2.

The reactors La1, La2, Lb1, Lb2, Lc1, and Lc2 are the reactor stacked body 9. The reactors La1, La2, Lb1, Lb2, Lc1, and Lc2 are connected in parallel with each other. The step-up circuit 90 is electrically connected to the reactors La1 and La2 via the terminal Ta, electrically connected to the reactors Lb1 and Lb2 via the terminal Tb, and electrically connected to the reactors Lc1 and Lc2 via the terminal Tc. The fuel cell FC is electrically connected to the step-up circuit 90 via a terminal Tg of the terminal plate 7. The terminal Tg corresponds to the projecting portion 70 in FIG. 2.

The switching elements SWa to SWc are each a power MOSFET (Metal-Oxide-Semiconductor Field-Effect Transistor) in an IPM (Intelligent Power Module) unit, for example. The switching elements SWa to SWc are each controlled on and off in accordance with PWM (Pulse Width Modulation) signals Va to Vc input from an ECU (Electronic Control Unit) (not illustrated), for example.

The drain of the switching elements SWa to SWc is electrically connected to the terminals Ta to Tc and the anode of the diodes Da to Dc, respectively. The source of the switching elements SWa to SWc is electrically connected to the terminal Tg and the inverter 91. The gate of the switching elements SWa to SWc is electrically connected to the ECU, for example.

The diodes Da to Dc rectify a current from the fuel cell FC. The cathode of the diodes Da to Dc is electrically connected to the inverter 91. The capacitors Ca to Cc smooth the voltage of the fuel cell FC. One end of the capacitors Ca to Cc is electrically connected to the cathode of the diodes Da to Dc, respectively, and the inverter 91. The other end of the capacitors Ca to Cc is electrically connected to the terminal Tg and the inverter 91.

The step-up converter includes the step-up circuit 90 and the reactors La1, La2, Lb1, Lb2, Lc1, and Lc2. The voltage of the fuel cell FC is stepped up in accordance with the duty ratio of the PWM signals Va to Vc that are input to the switching elements SWa to SWc, respectively. The inverter 91 converts power of the fuel cell FC from DC into AC, and outputs the AC power to the motor 92. The motor 92 drives the fuel cell vehicle using the power of the fuel cell FC.

The inductance values of the reactors La1, La2, Lb1, Lb2, Lc1, and Lc2 are determined on the basis of the maximum supply power required for the motor 92, for example. As described above, the inductance values can be adjusted in accordance with the number of reactor sheets 10 stacked in the reactor stacked body 9.

The various design values of the switching elements SWa to SWc, the diodes Da to Dc, and the capacitors Ca to Cc are unlikely to be affected by the specifications of the motor 92 compared to the reactors La1, La2, Lb1, Lb2, Lc1, and Lc2. Therefore, general-purpose switching elements SWa to SWc, diodes Da to Dc, and capacitors Ca to Cc can be used for the step-up circuit 90. A general-purpose inverter circuit may be used for the step-up circuit 90.

As described above, the fuel cell module has the cell stacked body 4 and the reactor stacked body 9. The cell stacked body 4 includes the plurality of unit cells 40 that are stacked on each other, and the reactor stacked body 9 includes the plurality of reactor sheets 10 that are stacked on each other. The plurality of reactor sheets 10 has the coil 8. The cell stacked body 4 is superposed on the reactor stacked body 9 so as to be electrically connected to the coil 8.

The conductor 100 that constitutes a part of the coil 8 is embedded in each of the reactor sheets 10. The conductor 100 has the end portions 13 and 14 that are exposed from surfaces of each of the reactor sheets 10 on the opposite sides from each other. The end portion 13 of one reactor sheet 10, of a set of reactor sheets 10 that are adjacent to each other, contacts the end portion 14 of the other reactor sheet 10.

In the configuration described above, the conductor 100 that constitutes a part of the coil 8 is embedded in each of the reactor sheets 10. Therefore, the inductance values of the reactors La1, La2, Lb1, Lb2, Lc1, and Lc2 can be adjusted in accordance with the number of reactor sheets 10 stacked.

Therefore, a design change can be easily made to the inductance values by changing the number of reactor sheets 10 stacked even in the case where the specifications of the motor 92 of the fuel cell system are changed. Thus, according to the present example, it is possible to reduce the trouble of making a design change to the fuel cell system.

In the case where an ordinary winding coil is used as the reactor of the step-up converter, for example, the number of turns and the diameter of the winding coil are increased as the maximum supply power required for the motor 92 is larger, for example. Therefore, a larger space is required to install the step-up converter as the maximum supply power for the motor 92 is larger, for example.

In contrast, the coil 8 is divided into the plurality of conductors 100 to be embedded in the reactor sheets 10, and therefore is smaller in size than the ordinary winding coil.

Thus, with the fuel cell module, the installation space for the step-up converter can be reduced. In the present example, a step-up converter is taken as an example. However, the same effect as described above can be obtained also for a step-down converter.

Reactor Sheet 10 according to First Modification

In the embodiment described above, the inlet manifold hole and the outlet manifold hole for the cooling medium are connected to each other through the flow path grooves 36 and 37 in the end portion current collector plate 3. However, the present disclosure is not limited thereto. A flow path groove that connects between the inlet manifold hole and the outlet manifold hole for the cooling medium may be provided in at least one of the reactor sheets 10, in place of or in addition to the flow path grooves 36 and 37, as described below.

Figure 12:
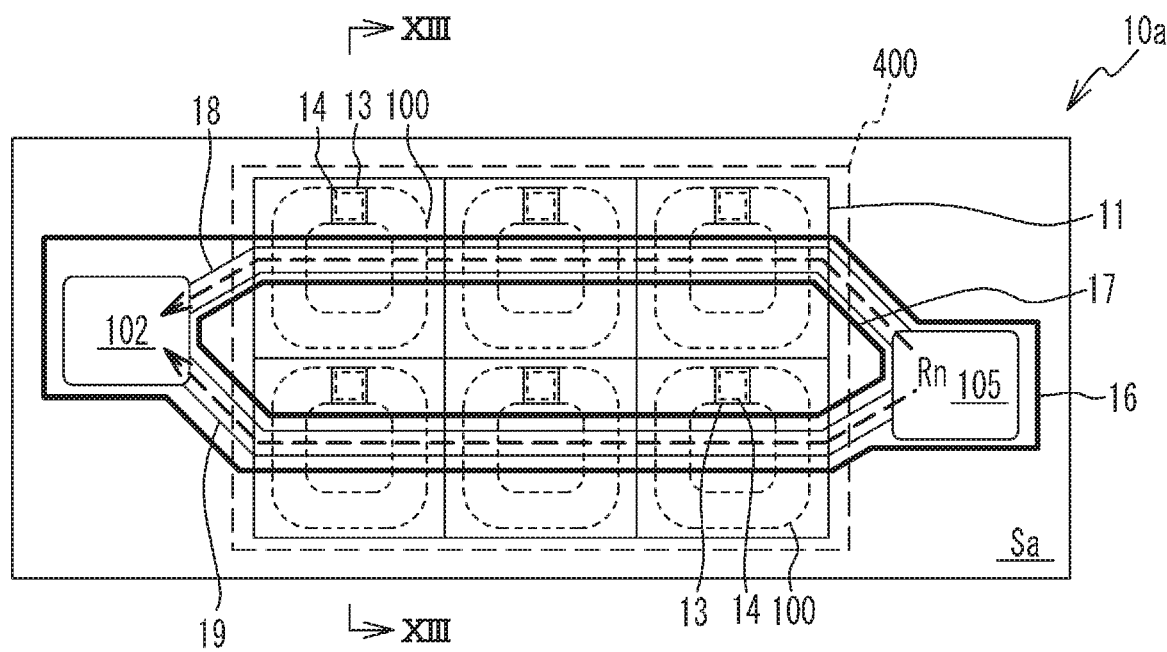
FIG. 12 is a plan view illustrating a reactor sheet according to a first modification.

FIG. 12 is a plan view illustrating a reactor sheet 10a according to a first modification. FIG. 12 is a plan view of the reactor sheet 10a as seen from the cell stacked body 4 side. In FIG. 12, components that are the same as those in FIG. 4 are given the same reference numerals to omit description thereof.

Figure 13:
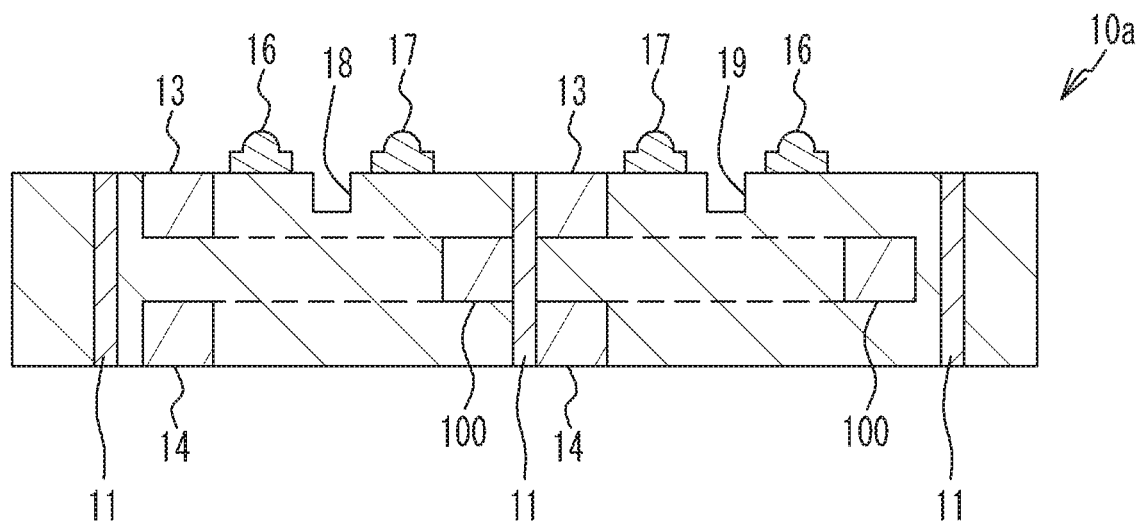
FIG. 13 is a sectional view of the reactor sheet taken along the line XIII-XIII in FIG. 12.

FIG. 13 is a sectional view of the reactor sheet 10a taken along the line XIII-XIII in FIG. 12. The reactor sheet 10a has through holes 102 and 105, two flow path grooves 18 and 19 that connect between the through holes 102 and 105, and gaskets 16 and 17. The flow path grooves 18 and 19 are formed in the surface Sa of the reactor sheet 10a on the cell stacked body 4 side so as to avoid the end portions 13 of the conductors 100. The depth of the flow path grooves 18 and 19 is set not to reach the conductors 100 inside the reactor sheet 10a.

As described above, the through hole 105 constitutes the inlet manifold hole for the cooling medium, and the through hole 102 constitutes the outlet manifold hole for the cooling medium. The cooling medium flows through the flow path grooves 18 and 19 from the through hole 105 as indicated by the arrow Rn to reach the through hole 102.

The route of the flow path grooves 18 and 19 extends across the conductors 100 that overlap the power generation region 400 in the stacking direction Y of the reactor stacked body 9, for example. Therefore, the conductors 100 are efficiently cooled by the cooling medium that flows through the flow path grooves 18 and 19. The flow path grooves 18 and 19 are examples of a first flow path groove.

The surfaces of the flow path grooves 18 and 19 are plated or coated with a resin to prevent corrosion due to the cooling medium, for example. The shape, the route, and the number of the flow path grooves 18 and 19 are not limited.

The gaskets 16 and 17 surround the through holes 102 and 105 and the flow path grooves 18 and 19. One of the gaskets (the gasket 16) is disposed on the outer side of the through holes 102 and 105 and the flow path grooves 18 and 19, and the other of the gaskets (the gasket 17) is disposed on the inner side of the through holes 102 and 105 and the flow path grooves 18 and 19. The gaskets 16 and 17 are each formed as an elastic member such as rubber, for example, and bonded to the surface Sa of the reactor sheet 10a on the cell stacked body 4 side.

The gaskets 16 and 17 seal a region around the through holes 102 and 105 and the flow path grooves 18 and 19 between the reactor sheet 10a and a different reactor sheet 10a or the unit cell 40 that is adjacent thereto. Consequently, leakage of the cooling medium from the inlet manifold hole, the outlet manifold hole, and the flow path grooves 18 and 19 is suppressed.

In this manner, the flow path grooves 18 and 19 that connect between the inlet manifold hole and the outlet manifold hole for the cooling medium are provided in the surface Sa of the reactor sheet 10a on one side according to the present example. Therefore, the conductors 100 in the reactor stacked body 9 are effectively cooled compared to the reactor sheet 10 that is not provided with the flow path grooves 18 and 19. The flow path grooves 18 and 19 may be provided in the surface Sb on the opposite side.

The reactor sheet 10a that has the flow path grooves 18 and 19 may be disposed preferentially at a position away from the cell stacked body 4 such that the capability of the reactor stacked body 9 to warm the unit cells 40 is not lowered. In the case where the reactor stacked body 9 includes a plurality of reactor sheets 10a, the reactor sheet 10a that is farther from the cell stacked body 4 may have a larger number of flow path grooves 18 and 19 or flow path grooves 18 and 19 with a larger cross section. This also suppresses a reduction in the capability of the reactor stacked body 9 to warm the unit cells 40.

Reactor Sheet 10 According to Second Modification

While the reactor sheet 10a according to the first modification has a sequence of flow path grooves 18 and 19, the present disclosure is not limited thereto. For example, the sequence of flow path grooves 18 and 19 may be provided separately in a set of reactor sheets 10a that are adjacent to each other.

Figure 14:
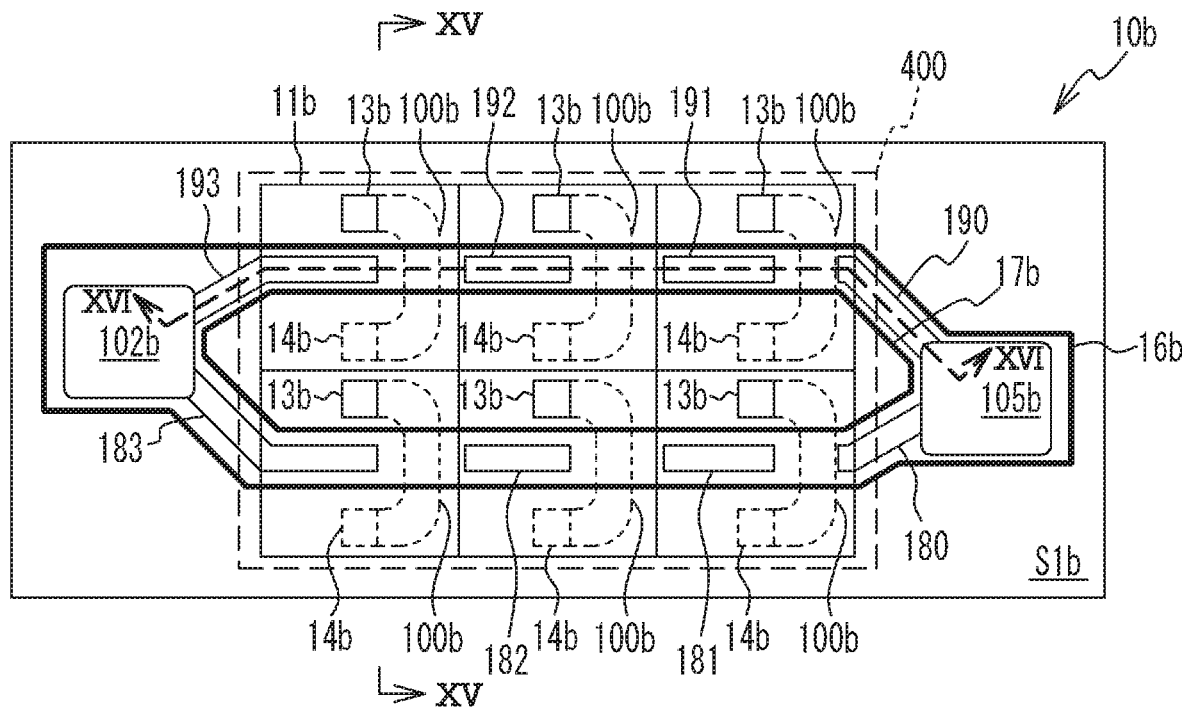
FIG. 14 is a plan view illustrating a set of reactor sheets according to a second modification.
Figure 14:
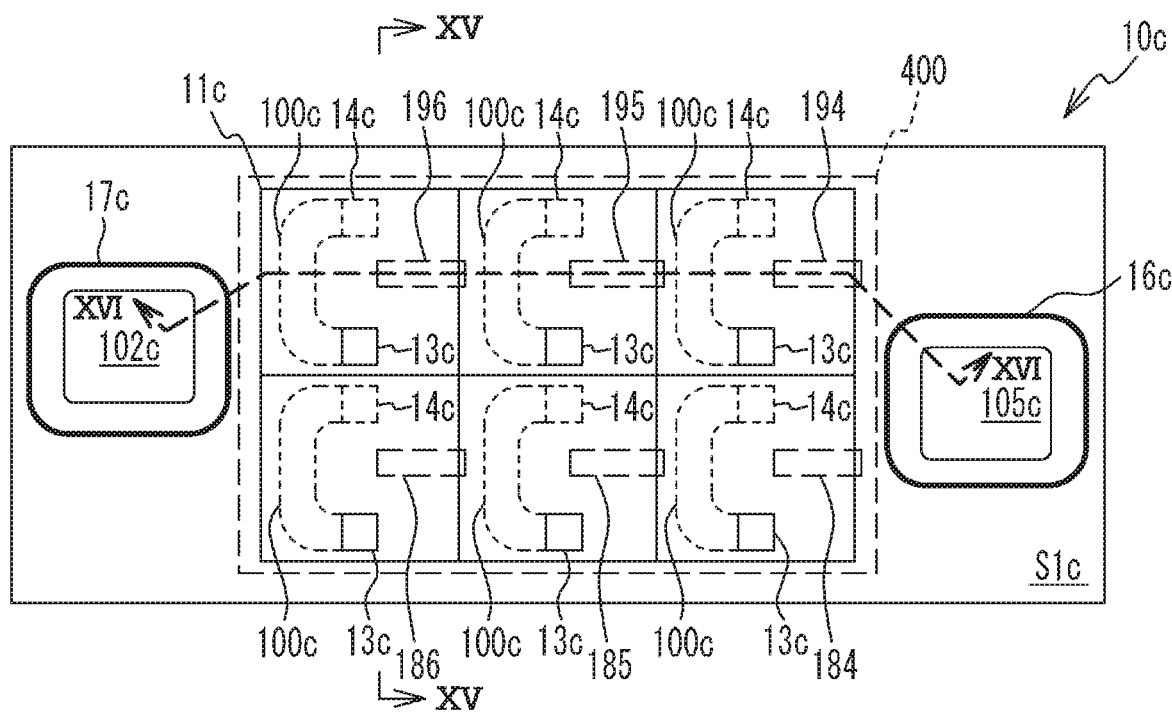

FIG. 14 is a plan view illustrating a set of reactor sheets 10b and 10c according to a second modification. FIG. 14 is a plan view of the reactor sheets 10b and 10c as seen from the cell stacked body 4 side. The sheet stacked body 1 has two types of reactor sheets 10b and 10c that are stacked alternately in place of the reactor sheets 10 and 10a described above.

Figure 15:
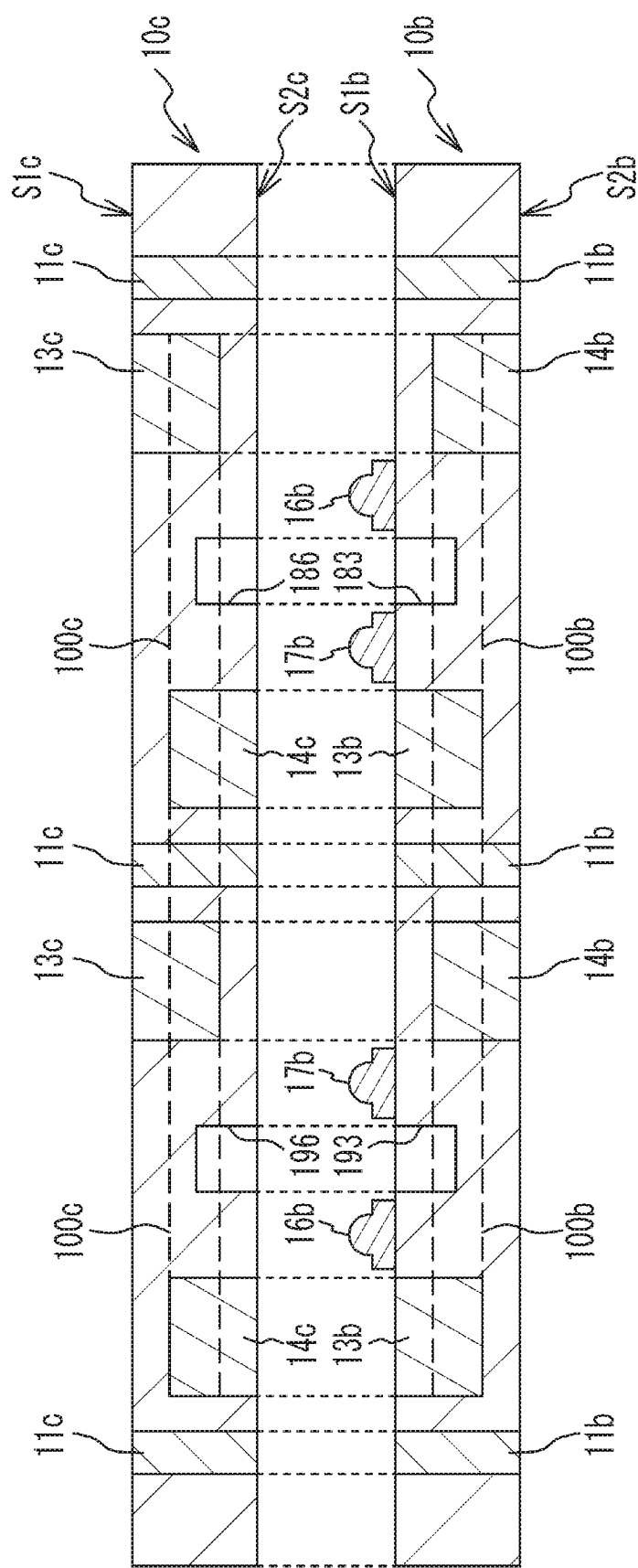
FIG. 15 is a sectional view of the reactor sheets taken along the line XV-XV in FIG. 14.

FIG. 15 is a sectional view of the reactor sheets 10b and 10c taken along the line XV-XV in FIG. 14. The reactor sheets 10b and 10c are adjacent to each other in the reactor stacked body 9.

The reactor sheet 10b has through holes 102b and 105b, conductors 100b, a shielding portion 11b, flow path grooves 190 to 193 and 180 to 183, and gaskets 16b and 17b. The reactor sheet 10c has through holes 102c and 105c, conductors 100c, a shielding portion 11c, flow path grooves 194 to 196 and 184 to 186, and gaskets 16c and 17c.

The through holes 102b and 102c overlap each other in the stacking direction Y, and constitute an outlet manifold hole as with the through hole 102. The through holes 105b and 105c overlap each other in the stacking direction Y, and constitute an inlet manifold hole as with the through hole 105. The shielding portions 11a and 11b overlap each other in the stacking direction Y, and suppress magnetic interference between the conductors 100b and 100c as with the shielding portion 11.

The conductors 100b and 100c correspond to half a turn of the coil 8. That is, the conductors 100b and 100c each have a generally U-shape corresponding to half a turn of the conductor 100 in a ring shape described above. The conductors 100b and 100c are embedded at a position overlapping the power generation regions 400 of the unit cells 40 in the stacking direction Y of the reactor stacked body 9.

The conductor 100b is embedded in the reactor sheet 10b, and has end portions 13b and 14b. The end portion 13b at one end is exposed from a surface S1b on the cell stacked body 4 side, and the end portion 14b at the other end is exposed from a surface S2b on the end portion current collector plate 3 side. The end portions 13b and 14b have a square shape, by way of example. However, the present disclosure is not limited thereto.

The conductor 100c is embedded in the reactor sheet 10c, and has end portions 13c and 14c. The end portion 13c at one end is exposed from a surface S1c on the cell stacked body 4 side, and the end portion 14c at the other end is exposed from a surface S2c on the end portion current collector plate 3 side. The end portions 13c and 14c have a square shape, by way of example. However, the present disclosure is not limited thereto.

The end portions 13b and 14c overlap each other in the stacking direction Y of the reactor stacked body 9. Therefore, the end portion 14c of the conductor 100c of one reactor sheet 10c, of a set of reactor sheets 10b and 10c that are adjacent to each other in the reactor stacked body 9, contacts the end portion 13b of the conductor 100b of the other reactor sheet 10b. Consequently, the conductors 100b and 100c are electrically connected to each other, and therefore have a ring shape that is similar to that of the conductor 100.

Further, the end portions 13c and 14b overlap each other in the stacking direction Y of the reactor stacked body 9. Therefore, the end portion 13c of the conductor 100c of one reactor sheet 10c contacts the end portion 14b of the conductor 100b of the reactor sheet 10b, of another adjacent set of reactor sheets 10b and 10c that are adjacent to each other in the reactor stacked body 9. Thus, the conductors 100b and 100c of the reactor sheets 10b and 10b are electrically connected to each other to constitute the coil 8.

The flow path grooves 190 to 193 and 180 to 183 are provided in the surface S1b on the cell stacked body 4 side so as not to overlap the conductor 100b in the stacking direction Y of the reactor stacked body 9. In addition, the flow path grooves 190 to 193 and 180 to 183 are provided at a position overlapping the conductor 100c of the other reactor sheet 10c in the stacking direction Y of the reactor stacked body 9.

The flow path grooves 190 to 193 are disposed at intervals along the route of the flow path groove 18 described above, and the flow path grooves 190 and 193 at both ends are connected to the through holes 105b and 102b, respectively. The flow path grooves 180 to 183 are disposed at intervals along the route of the flow path groove 19 described above, and the flow path grooves 180 and 183 at both ends are connected to the through holes 105b and 102b, respectively.

The surfaces of the flow path grooves 190 to 193 and 180 to 183 are plated or coated with a resin to prevent corrosion due to the cooling medium, for example. The flow path grooves 190 to 193 and 180 to 183 are examples of a fourth flow path groove.

The flow path grooves 194 to 196 and 184 to 186 are provided in the surface S1c that faces the surface S1b of the other reactor sheet 10b so as not to overlap the conductor 100c in the stacking direction Y of the reactor stacked body 9. In addition, the flow path grooves 194 to 196 and 184 to 186 are provided at a position overlapping the conductor 100b of the other reactor sheet 10b in the stacking direction Y of the reactor stacked body 9.

The flow path grooves 194 to 196 are disposed at intervals along the route of the flow path groove 18 described above. The flow path grooves 194 to 196 are provided so as to fill the gaps between the flow path grooves 190 to 193 in the route of the flow path groove 18. In addition, the flow path grooves 184 to 186 are disposed at intervals along the route of the flow path groove 19 described above. The flow path grooves 184 to 186 are provided so as to fill the gaps between the flow path grooves 180 to 183 in the route of the flow path groove 19.

The surfaces of the flow path grooves 194 to 196 and 184 to 186 are plated or coated with a resin to prevent corrosion due to the cooling medium, for example. The flow path grooves 194 to 196 and 184 to 186 are examples of a fifth flow path groove.

When the reactor sheets 10b and 10c are superposed on each other, the flow path grooves 190 to 193 and the flow path grooves 194 to 196 are connected to each other, and the flow path grooves 180 to 183 and the flow path grooves 184 to 186 are connected to each other. Consequently, a sequence of flow paths that connect between the inlet manifold hole and the outlet manifold hole for the cooling medium are formed.

Figure 16:
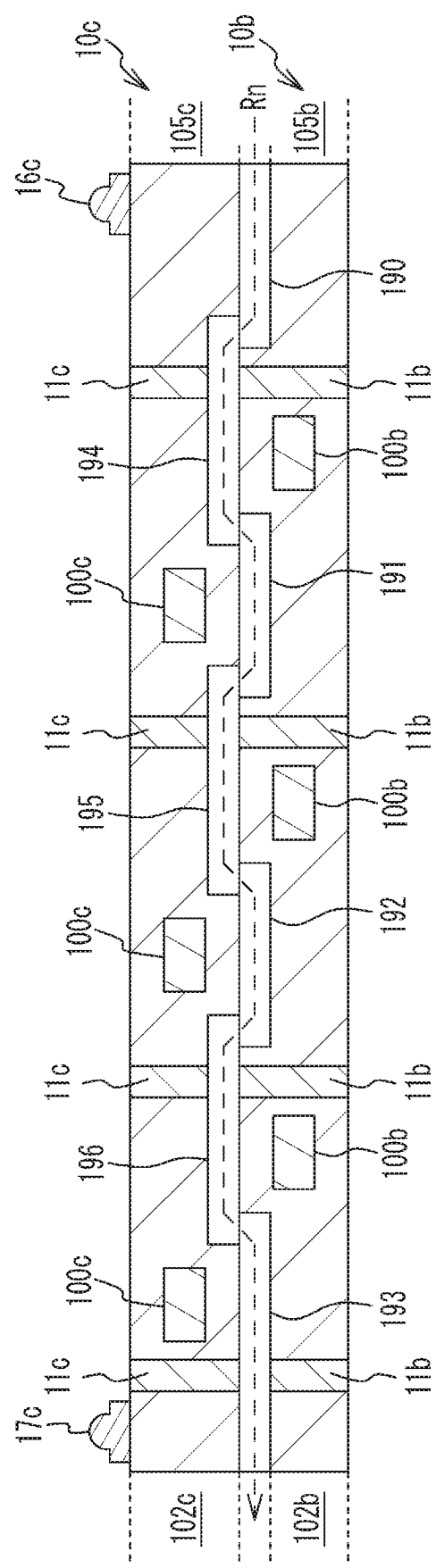
FIG. 16 is a sectional view of the reactor sheets taken along the line XVI-XVI in FIG. 14.

FIG. 16 is a sectional view of the reactor sheets 10b and 10c taken along the line XVI-XVI in FIG. 14. FIG. 16 illustrates a flow path constituted by connecting the flow path grooves 190 to 193 and the flow path grooves 194 to 196 to each other.

One end of the flow path groove 193 is connected to the through hole 102b, and the other end of the flow path groove 193 is connected to one end of the flow path groove 196. One end of the flow path groove 192 is connected to the other end of the flow path groove 196, and the other end of the flow path groove 192 is connected to one end of the flow path groove 195. One end of the flow path groove 191 is connected to the other end of the flow path groove 195, and the other end of the flow path groove 191 is connected to one end of the flow path groove 194. One end of the flow path groove 190 is connected to the other end of the flow path groove 194, and the other end of the flow path groove 190 is connected to the through hole 105b.

In this manner, with the end portions of the flow path grooves 190 to 193 and the end portions of the flow path grooves 194 to 196 overlapping each other in the stacking direction Y, a flow path that is routed similarly to the flow path groove 18 described above (see the arrow Rn) is formed. Therefore, the cooling medium flows from the through holes 105b and 105c on the inlet side and alternately through the flow path grooves 190 to 193 in one reactor sheet 10c and the flow path grooves 194 to 196 in the other reactor sheet 10b to reach the through holes 102b and 102c on the outlet side. In addition, with the end portions of the flow path grooves 180 to 183 and the end portions of the flow path grooves 184 to 186 overlapping each other in the stacking direction Y, a flow path groove that is routed similarly to the flow path groove 19 described above is formed, although not illustrated.

Consequently, the through holes 105b and 105c for the inlet manifold hole and the through holes 102b and 102c for the outlet manifold hole communicate with each other. The form of the flow path grooves 190 to 193 and 180 to 183 and the flow path grooves 194 to 196 and 184 to 186 is not limited as long as the through holes 105b and 105c and the through holes 102b and 102c communicate with each other without such flow path grooves overlapping the end portions 13b, 13c, 14b, and 14c of the conductors 100b and 100c.

With reference to FIGS. 14 and 15 again, the gaskets 16b and 17b surround the through holes 102b and 105b and the flow path grooves 190 to 193 and 180 to 183. One of the gaskets (the gasket 16b) is disposed on the outer side of the through holes 102b and 105b and the flow path grooves 190 to 193 and 180 to 183, and the other of the gaskets (the gasket 17b) is disposed on the inner side of the through holes 102b and 105b and the flow path grooves 190 to 193 and 180 to 183. The gaskets 16b and 17b are each formed as an elastic member such as rubber, for example, and bonded to the surface S1b of the reactor sheet 10b on the cell stacked body 4 side.

The gaskets 16b and 17b seal a region around the through holes 102b, 105b, 102c, and 105c and the flow path grooves 190 to 196 and 180 to 186 between the reactor sheet 10b and a different reactor sheet 10c that is adjacent thereto. Consequently, leakage of the cooling medium from the inlet manifold hole, the outlet manifold hole, and the flow path grooves 190 to 196 and 180 to 186 is suppressed.

The gaskets 16c and 17c surround the through holes 105c and 102c, respectively. The gaskets 16c and 17c are each formed as an elastic member such as rubber, for example, and bonded to the surface S1c of the reactor sheet 10c on the cell stacked body 4 side.

The gaskets 16c and 17c seal a region around the through holes 102b, 105b, 102c, and 105c between the reactor sheet 10c and a different reactor sheet 10b or the unit cell 40 that is adjacent thereto. Consequently, leakage of the cooling medium from the inlet manifold hole and the outlet manifold hole is suppressed.

As described above, the set of reactor sheets 10b and 10c that are adjacent to each other respectively have the flow path grooves 190 to 193 and 180 to 183 and the flow path grooves 194 to 196 and 184 to 186 in the surfaces S1b and S2c that face each other. The flow path grooves 190 to 193 and 180 to 183 do not overlap the conductors 100b of the reactor sheet 10b, but overlap the conductors 100c of the different reactor sheet 10c, in the stacking direction Y. The flow path grooves 194 to 196 and 184 to 186 do not overlap the conductors 100c of the reactor sheet 10c, but overlap the conductors 100b of the different reactor sheet 10b, in the stacking direction Y.

The flow path grooves 190 to 193 and 180 to 183 and the flow path grooves 194 to 196 and 184 to 186 are connected to each other to allow the inlet manifold hole and the outlet manifold hole to communicate with each other.

With this configuration, the inlet manifold hole and the outlet manifold hole communicate with each other, and therefore the cooling medium flows through the flow path grooves 190 to 196 and 180 to 186. The flow path grooves 190 to 193 and 180 to 183 overlap the conductors 100c of the other reactor sheet 10c, and therefore the conductors 100c are cooled by the cooling medium that flows through the flow path grooves 190 to 193 and 180 to 183. The flow path grooves 194 to 196 and 184 to 186 overlap the conductors 100b of the other reactor sheet 10b, and therefore the conductors 100b are cooled by the cooling medium that flows through the flow path grooves 194 to 196 and 184 to 186.

The flow path grooves 190 to 193 and 180 to 183 do not overlap the conductors 100b, and therefore it is not necessary that the thickness of the reactor sheet 10b should be larger than the total of the depth of the flow path grooves 190 to 193 and 180 to 183 and the thickness of the conductors 100b. Similarly, the flow path grooves 194 to 196 and 184 to 186 also do not overlap the conductors 100c, and therefore it is not necessary that the thickness of the reactor sheet 10c does not need be larger than the total of the depth of the flow path grooves 194 to 196 and 184 to 186 and the thickness of the conductors 100c.

Thus, according to the present example, the thickness of the reactor sheets 10b and 10c can be made thinner than that of the reactor sheet 10a according to the first modification while maintaining the cooling performance of the reactor sheets 10b and 10c at about the same level as that according to the first modification.

Reactor Sheet 10 According to Third Modification

In the reactor sheets 10b and 10c according to the second modification, the flow path grooves 190 to 196 and 180 to 186 are provided in only one of the surfaces S1b and S2c that face each other. However, the present disclosure is not limited thereto. For example, the flow path grooves 190 to 193 and 180 to 183 may be provided in one of the surfaces, and the flow path grooves 194 to 196 and 184 to 186 may be provided in the other surface.

Figure 17:
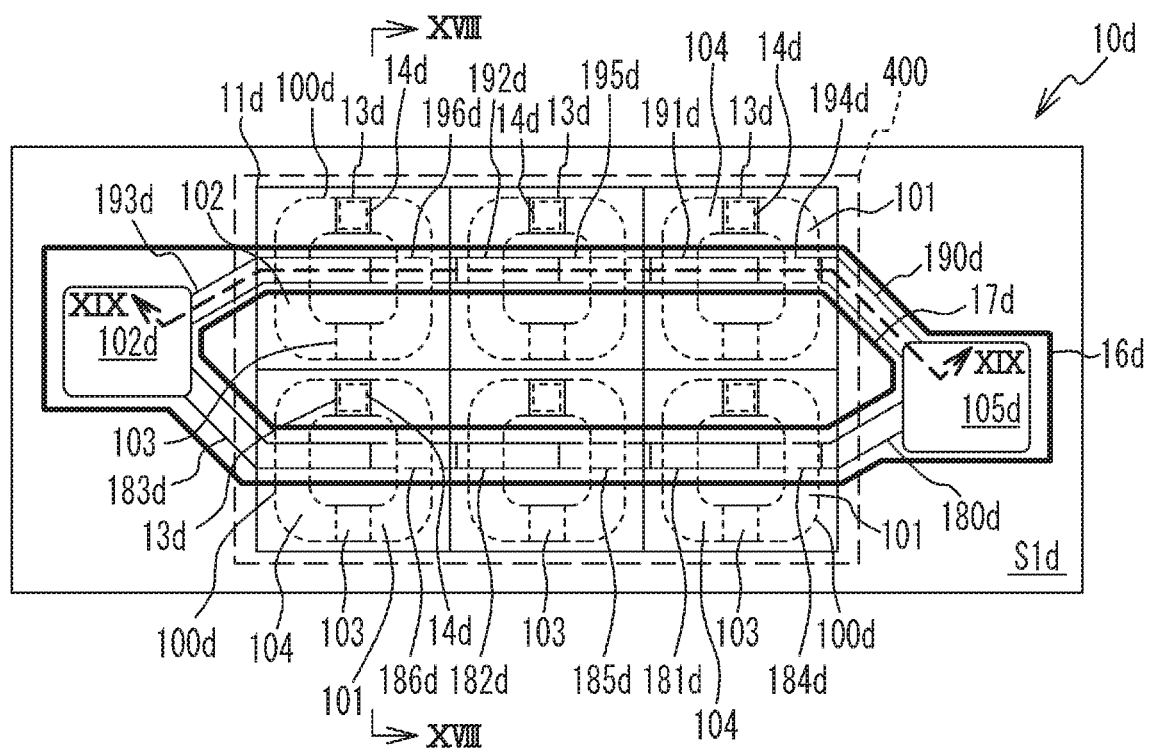
FIG. 17 is a plan view illustrating a reactor sheet according to a third modification.

FIG. 17 is a plan view illustrating a reactor sheet 10d according to a third modification. FIG. 17 is a plan view of the reactor sheet 10d as seen from the cell stacked body 4 side.

Figure 18:
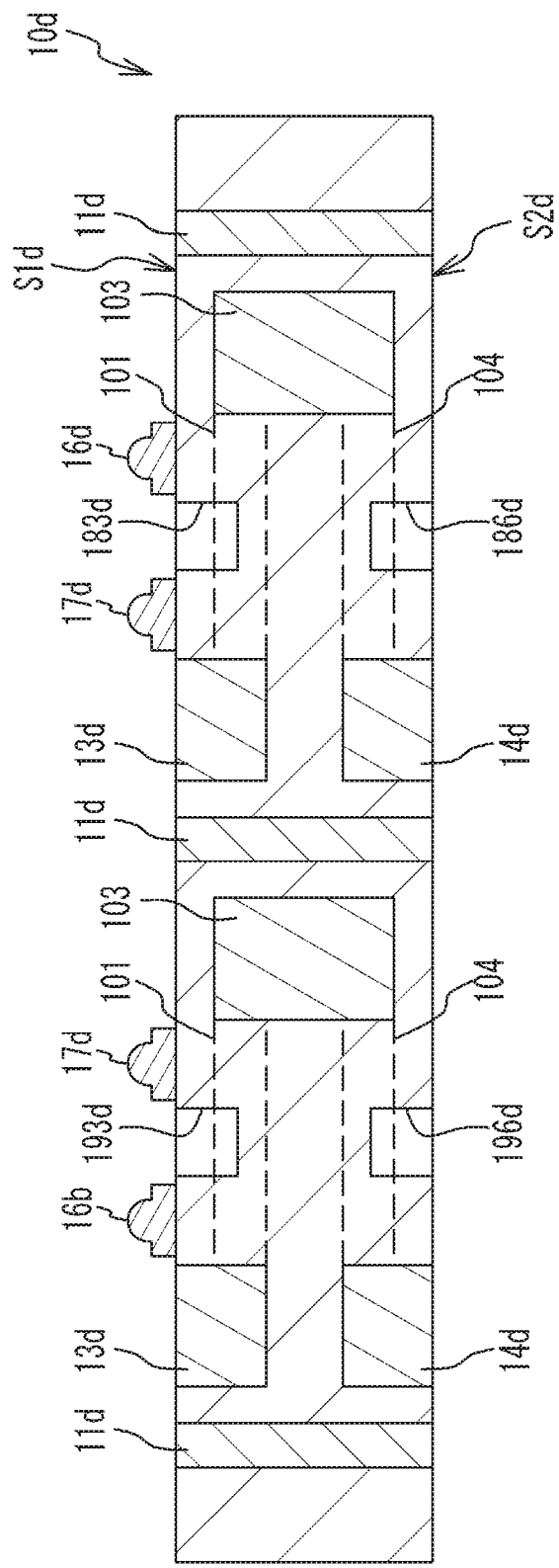
FIG. 18 is a sectional view of the reactor sheet taken along the line XVIII-XVIII in FIG. 17.

FIG. 18 is a sectional view of the reactor sheet 10d taken along the line XVIII-XVIII in FIG. 17. In the reactor sheet 10d, the surface S2b of the reactor sheet 10b and the surface S1c of the reactor sheet 10c according to the second modification are superposed on and integrated with each other.

The reactor sheet 10d has conductors 100d, a shielding portion 11d, through holes 102d and 105d, flow path grooves 190d to 196d and 180d to 186d, and gaskets 16d and 17d.

The through hole 102d constitutes the outlet manifold hole as with the through hole 102. The through hole 105d constitutes the inlet manifold hole as with the through hole 105. The shielding portion 11d suppresses magnetic interference among the conductors 100d as with the shielding portion 11.

The conductors 100d each have a ring shape as viewed in plan, and are embedded in the reactor sheet 10d so as to overlap the power generation region 400 in the stacking direction Y of the reactor stacked body 9. The conductors 100d each have a pair of cut piece portions (a first cut piece portion and a second cut piece portion) 101 and 104 in a generally U-shape corresponding to half a turn of the ring shape, a connection portion 103 that connects the pair of cut piece portions 101 and 104 to each other, and end portions 13*d* and 14*d*.

The cut piece portions 101 and 104 are respectively shaped similarly to the conductors 100*b* and 100*c* described above. One cut piece portion 101 is disposed on the through hole 105*d* side, and embedded in the vicinity of a surface S1*d* on the cell stacked body 4 side. The other cut piece portion 104 is disposed on the through hole 102*d* side, and embedded in the vicinity of a surface S2*d* on the end portion current collector plate 3 side. The cut piece portions 101 and 104 are embedded in the reactor sheet 10*d* at different depths from each other.

The connection portion 103 has a shape in which the end portions 13*c* and 14*b* described above are superposed on and integrated with each other, and is provided at one end of the cut piece portions 101 and 104. The end portion 13*d* is provided at the other end of one cut piece portion 101, and the end portion 14*d* is provided at the other end of the other cut piece portion 104.

One of the end portions (the end portion 13*d*) is exposed from the surface S1*d* on the cell stacked body 4 side, and the other of the end portions (the end portion 14*d*) is exposed from the surface S2*d* on the end portion current collector plate 3 side. The end portions 13*d* and 14*d* overlap each other in the stacking direction Y of the reactor stacked body 9 as with the end portions 13 and 14 described above. The end portions 13*d* and 14*d* have a square shape, by way of example. However, the present disclosure is not limited thereto.

The flow path grooves 190*d* to 193*d* and 180*d* to 183*d* are provided in the surface S1*d* on the cell stacked body 4 side so as not to overlap one cut piece portion 101, but so as to overlap the other cut piece portion 104, in the stacking direction Y of the reactor stacked body 9. The depth of the flow path grooves 190*d* to 193*d* and 180*d* to 183*d* is set so as not to reach the cut piece portion 104.

The flow path grooves 194*d* to 196*d* and 184*d* to 186*d* are provided in the surface S2*d* on the end portion current collector plate 3 side so as not to overlap one cut piece portion 104, but so as to overlap the other cut piece portion 101, in the stacking direction Y of the reactor stacked body 9. The depth of the flow path grooves 194*d* to 196*d* and 184*d* to 186*d* is set so as not to reach the cut piece portion 101.

The flow path grooves 190*d* to 193*d* are disposed at intervals along the route of the flow path groove 18 described above, and the flow path grooves 190*d* and 193*d* at both ends are connected to the through holes 105*d* and 102*d*, respectively. The flow path grooves 180*d* to 183*d* are disposed at intervals along the route of the flow path groove 19 described above, and the flow path grooves 180*d* and 183*d* at both ends are connected to the through holes 105*d* and 102*d*, respectively.

The surfaces of the flow path grooves 190*d* to 193*d* and 180*d* to 183*d* are plated or coated with a resin to prevent corrosion due to the cooling medium, for example. The flow path grooves 190*d* to 193*d* and 180*d* to 183*d* are examples of a second flow path groove.

The flow path grooves 194*d* to 196*d* are disposed at intervals along the route of the flow path groove 18 described above. The flow path grooves 194*d* to 196*d* are provided so as to fill the gaps between the flow path grooves 190*d* to 193*d* in the route of the flow path groove 18. In addition, the flow path grooves 184*d* to 186*d* are disposed at intervals along the route of the flow path groove 19 described above. The flow path grooves 184*d* to 186*d* are provided so as to fill the gaps between the flow path grooves 180*d* to 183*d* in the route of the flow path groove 19.

The surfaces of the flow path grooves 194*d* to 196*d* and 184*d* to 186*d* are plated or coated with a resin to prevent corrosion due to the cooling medium, for example. The flow path grooves 194*d* to 196*d* and 184*d* to 186*d* are examples of a third flow path groove.

In a set of reactor sheets 10*d* that are adjacent to each other in the reactor stacked body 9, the flow path grooves 190*d* to 193*d* of one reactor sheet 10*d* and the flow path grooves 194*d* to 196*d* of the other reactor sheet 10*d* are connected to each other. In addition, the flow path grooves 180*d* to 183*d* of one reactor sheet 10*d* and the flow path grooves 184*d* to 186*d* of the other reactor sheet 10*d* are connected to each other. Consequently, a sequence of flow paths that connect between the inlet manifold hole and the outlet manifold hole for the cooling medium are formed.

Figure 19:
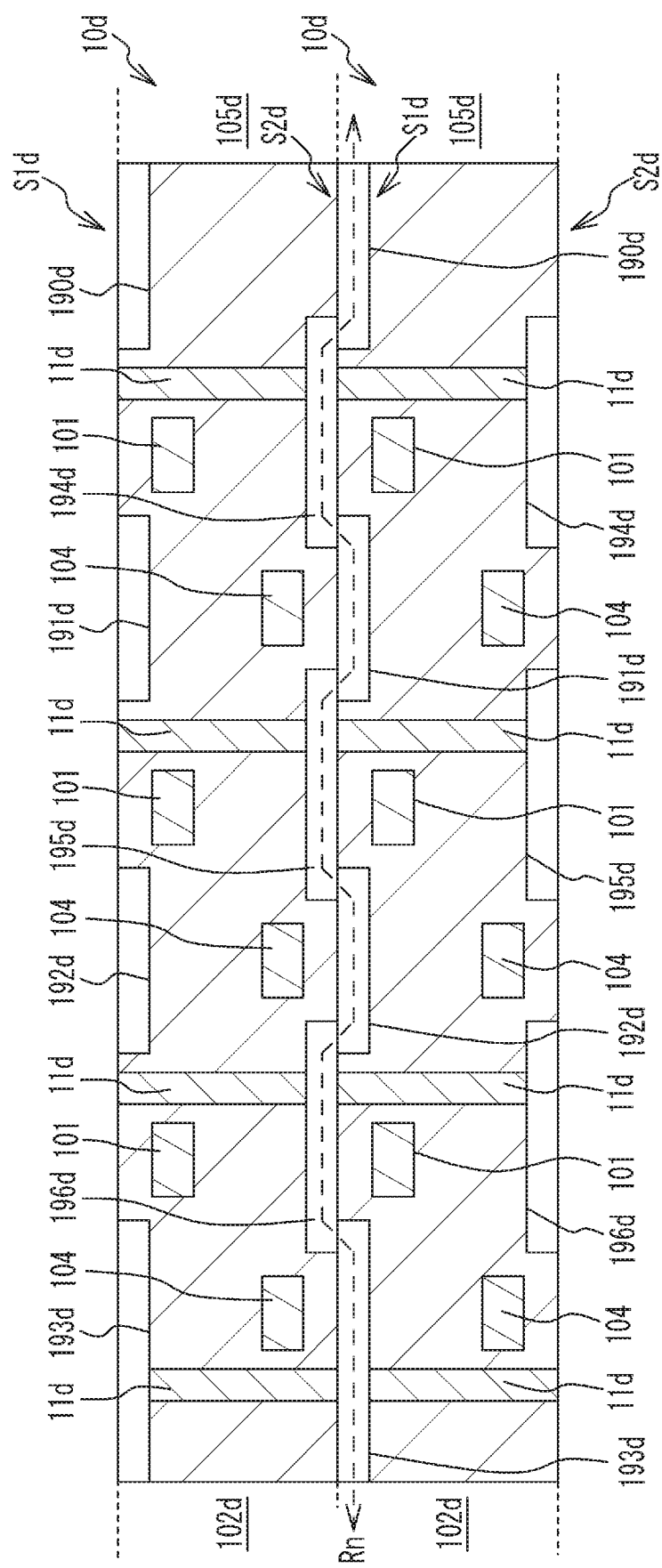
FIG. 19 is a sectional view of the reactor sheets taken along the line XIX-XIX in FIG. 17.

FIG. 19 is a sectional view of the reactor sheets 10*d* taken along the line XIX-XIX in FIG. 17. FIG. 19 illustrates a flow path constituted by connecting the flow path grooves 190*d* to 193*d* of one reactor sheet 10*d*, in a set of reactor sheets 10*d* that are adjacent to each other, and the flow path grooves 194*d* to 196*d* of the other reactor sheet 10*d* to each other. In the following description, the reactor sheet 10*d* on the lower side of the drawing sheet of FIG. 19 is represented as a "lower reactor sheet 10*d*", and the reactor sheet 10*d* on the upper side of the drawing sheet of FIG. 19 is represented as an "upper reactor sheet 10*d*".

One end of the flow path groove 193*d* of the lower reactor sheet 10*d* is connected to the through hole 102*d* of the upper reactor sheet 10*d*, and the other end of the flow path groove 193*d* of the lower reactor sheet 10*d* is connected to one end of the flow path groove 196*d* of the upper reactor sheet 10*d*. One end of the flow path groove 192*d* of the lower reactor sheet 10*d* is connected to the other end of the flow path groove 196*d* of the upper reactor sheet 10*d*, and the other end of the flow path groove 192*d* of the lower reactor sheet 10*d* is connected to one end of the flow path groove 195*d* of the upper reactor sheet 10*d*.

One end of the flow path groove 191*d* of the lower reactor sheet 10*d* is connected to the other end of the flow path groove 195*d* of the upper reactor sheet 10*d*, and the other end of the flow path groove 191*d* of the lower reactor sheet 10*d* is connected to one end of the flow path groove 194*d* of the upper reactor sheet 10*d*. One end of the flow path groove 190*d* of the lower reactor sheet 10*d* is connected to the other end of the flow path groove 194*d* of the upper reactor sheet 10*d*, and the other end of the flow path groove 190*d* of the lower reactor sheet 10*d* is connected to of the through hole 105*d* of the upper reactor sheet 10*d*.

In this manner, with the end portions of the flow path grooves 190*d* to 193*d* and the end portions of the flow path grooves 194*d* to 196*d* overlapping each other in the stacking direction Y, a flow path that is routed similarly to the flow path groove 18 described above (see the arrow Rn) is formed. Therefore, the cooling medium flows from the through hole 105*d* on the inlet side and alternately through the flow path grooves 190*d* to 193*d* in the lower reactor sheet 10*d* and the flow path grooves 194*d* to 196*d* in the upper reactor sheet 10*d* to reach the through holes 105*d* on the outlet side. In addition, with the end portions of the flow path grooves 180*d* to 183*d* of the lower reactor sheet 10*d* and the end portions of the flow path grooves 184*d* to 186*d* of the upper reactor sheet 10*d* overlapping each other in the stacking direction Y, a flow path groove that is routed similarly to the flow path groove 19 described above is formed, although not illustrated.

Consequently, the through hole 105d for the inlet manifold hole and the through hole 102d for the outlet manifold hole communicate with each other. The form of the flow path grooves 190d to 196d and 180d to 186d is not limited as long as such flow path grooves allow the through hole 105d and the through hole 102d to communicate with each other without overlapping the end portions 13d and 14d.

With reference to FIGS. 17 and 18 again, the gaskets 16d and 17d surround the through holes 102d and 105d and the flow path grooves 190d to 193d and 180d to 183d. One of the gaskets (the gasket 16d) is disposed on the outer side of the through holes 102d and 105d and the flow path grooves 190d to 193d and 180d to 183d, and the other of the gaskets (the gasket 17d) is disposed on the inner side of the through holes 102d and 105d and the flow path grooves 190d to 193d and 180d to 183d. The gaskets 16d and 17d are each formed as an elastic member such as rubber, for example, and bonded to the surface S1d of the reactor sheet 10d on the cell stacked body 4 side.

The gaskets 16d and 17d seal a region around the through holes 102d and 105d and the flow path grooves 190d to 196d and 180d to 186d between the surface S1d on one side and a different reactor sheet 10d that is adjacent thereto. Consequently, leakage of the cooling medium from the inlet manifold hole, the outlet manifold hole, and the flow path grooves 190d to 196d and 180d to 186d is suppressed.

As described above, the conductor 100d has a pair of cut piece portions 101 and 104 connected to each other at one end, and the pair of cut piece portions 101 and 104 are embedded in each of the reactor sheets 10d at different depths from each other. Each of the reactor sheets 10d has the flow path grooves 190d to 193d and 180d to 183d and the flow path grooves 194d to 196d and 184d to 186d in the surfaces S1d and S2d on the opposite sides from each other.

The flow path grooves 190d to 193d and 180d to 183d do not overlap one cut piece portion 101, but overlap the other cut piece portion 104, in the stacking direction Y of the reactor stacked body 9. The flow path grooves 194d to 196d and 184d to 186d do not overlap one cut piece portion 104, but overlap the other cut piece portion 101, in the stacking direction Y of the reactor stacked body 9.

The flow path grooves 190d to 193d and 180d to 183d are provided in the surface S1d on the one side so as not to overlap one cut piece portion 101 in the stacking direction Y of the reactor stacked body 9. The flow path grooves 194d to 196d and 184d to 186d are provided in the other surface S2d so as not to overlap the other cut piece portion 104 in the stacking direction Y of the reactor stacked body 9.

The flow path grooves 190d to 193d and 180d to 183d and the flow path grooves 194d to 196d and 184d to 186d that are provided in the surfaces S1d and S2d, that face each other, of a pair of reactor sheets 10 that are adjacent to each other are connected to each other to allow the inlet manifold hole and the outlet manifold hole to communicate with each other.

With this configuration, the inlet manifold hole and the outlet manifold hole communicate with each other, and therefore the cooling medium flows through the flow path grooves 190d to 196d and 180d to 186d. The flow path grooves 190d to 193d and 180d to 183d overlap one cut piece portion 104, and therefore the cut piece portion 104 is cooled by the cooling medium that flows through the flow path grooves 190d to 193d and 180d to 183d. In addition, the flow path grooves 194d to 196d and 184d to 186d overlap the other cut piece portion 101, and therefore the cut piece portion 101 is cooled by the cooling medium that flows through the flow path grooves 194d to 196d and 184d to 186d.

Therefore, flow paths for the cooling medium are formed in both the surfaces S1d and S2d of the reactor sheet 10d to allow the inlet manifold hole and the outlet manifold hole to communicate with each other, that improves the cooling efficiency of the reactor sheet 10d compared to the reactor sheets 10b and 10c according to the second modification.

In addition, the flow path grooves 190d to 193d and 180d to 183d do not overlap one cut piece portion 101, and the flow path grooves 190d to 196d and 180d to 186d do not overlap the other cut piece portion 104 of the conductor 100d. Therefore, the thickness of the reactor sheet 10d is reduced compared to a case where a sequence of flow path grooves that connect between the through holes 102d and 105d are provided in each of the surfaces S1d and S2d.

In the present example, the reactor stacked body 9 is adjacent to one end side of the cell stacked body 4. However, the reactor stacked body 9 may be provided at the middle of the cell stacked body 4. In this case, the intermediate current collector plate 2 is provided at both ends of the reactor stacked body 9 to be electrically connected to the unit cells 40.

The embodiment described above is a preferable embodiment of the present disclosure. However, the present disclosure is not limited thereto, and a variety of modifications may be made without departing from the scope and spirit of the present disclosure.

What is claimed is:
1. A fuel cell module comprising:
a first stacked body including a plurality of unit cells stacked on each other; and
a second stacked body including a plurality of magnetic body sheets stacked on each other, wherein:
the plurality of magnetic body sheets includes a coil;
the first stacked body is superposed on the second stacked body so as to be electrically connected to the coil;
a conductor serving as a part of the coil is embedded in each of the plurality of magnetic body sheets;
the conductor has a first end portion and a second end portion exposed from surfaces of each of the plurality of magnetic body sheets on opposite sides from each other; and
the first end portion of the conductor of one magnetic body sheet of a set of magnetic body sheets that are adjacent to each other, among the plurality of magnetic body sheets, contacts the second end portion of the conductor of the other magnetic body sheet of the set of magnetic body sheets.

2. The fuel cell module according to claim 1, wherein:
the first stacked body has a supply manifold hole configured such that a cooling medium for cooling the plurality of unit cells is supplied through the supply manifold hole, and a discharge manifold hole configured such that the cooling medium is discharged through the discharge manifold hole; and
the second stacked body has an inlet manifold hole communicating with the supply manifold hole, and an outlet manifold hole communicating with the discharge manifold hole.

3. The fuel cell module according to claim 2, wherein at least one of the plurality of magnetic body sheets has a first flow path groove configured to connect between the inlet manifold hole and the outlet manifold hole.

4. The fuel cell module according to claim 2, wherein:
the conductor has a first cut piece portion and a second cut piece portion connected to each other at one end;
the first cut piece portion and the second cut piece portion are embedded in each of the plurality of magnetic body sheets at different depths from each other;
each of the plurality of magnetic body sheets has a second flow path groove and a third flow path groove in surfaces of each of the plurality of magnetic body sheets on opposite sides from each other;
the second flow path groove overlaps the first cut piece portion, without overlapping the second cut piece portion, in a stacking direction of the second stacked body;
the third flow path groove overlaps the second cut piece portion, without overlapping the first cut piece portion, in the stacking direction of the second stacked body; and
the second flow path groove and the third flow path groove that are provided in respective surfaces of the set of magnetic body sheets that face each other are connected to each other to allow the inlet manifold hole and the outlet manifold hole to communicate with each other.

5. The fuel cell module according to claim 2, wherein:
the one magnetic body sheet of the set of magnetic body sheets has a fourth flow path groove and the other magnetic body sheet of the set of magnetic body sheets has a fifth flow path groove, the fourth flow path groove and the fifth flow path groove being provided in respective surfaces of the set of magnetic body sheets that face each other;
the fourth flow path groove overlaps the conductor of the other magnetic body sheet, without overlapping the conductor of the one magnetic body sheet, in a stacking direction of the second stacked body;
the fifth flow path groove overlaps the conductor of the one magnetic body sheet, without overlapping the conductor of the other magnetic body sheet, in the stacking direction of the second stacked body; and
the fourth flow path groove and the fifth flow path groove are connected to each other to allow the inlet manifold hole and the outlet manifold hole to communicate with each other.

6. The fuel cell module according to claim 1, wherein:
the conductor has a ring shape; and
the first end portion and the second end portion overlap each other in a stacking direction of the second stacked body.

7. The fuel cell module according to claim 2, wherein:
the second stacked body further includes a first current collector plate that is adjacent to a magnetic body sheet that is the farthest from the first stacked body, among the plurality of magnetic body sheets; and
the first current collector plate has a first conductive member configured to electrically connect the conductor to an electric circuit that is external to the fuel cell module, and a sixth flow path groove configured to connect between the inlet manifold hole and the outlet manifold hole.

8. The fuel cell module according to claim 1, wherein:
the second stacked body further includes a second current collector plate that is adjacent to a magnetic body sheet that is the closest to the first stacked body, among the plurality of magnetic body sheets;
the second current collector plate has a second conductive member including a first terminal contacting the first stacked body, and a second terminal contacting the magnetic body sheet that is the closest to the first stacked body; and
the first terminal has the same contact area as a size of a power generation region of each of the plurality of unit cells.

9. The fuel cell module according to claim 8, wherein the second terminal has the same contact area as a size of the first end portion or the second end portion of the conductor, whichever is disposed on a side of the second current collector plate.

* * * * *